United States Patent
Yamada et al.

(10) Patent No.: US 10,832,571 B2
(45) Date of Patent: Nov. 10, 2020

(54) SAFETY DRIVING ASSISTANT SYSTEM, SERVER, VEHICLE AND PROGRAM

(71) Applicants: SUMITOMO ELECTRIC INDUSTRIES, LTD., Osaka (JP); HONDA MOTOR CO., LTD., Tokyo (JP)

(72) Inventors: Hiroyuki Yamada, Osaka (JP); Shoichi Tanada, Osaka (JP); Shigeki Nishimura, Osaka (JP); Masataka Tokunaga, Osaka (JP); Hitoshi Konishi, Wako (JP)

(73) Assignees: SUMITOMO ELECTRIC INDUSTRIES, LTD., Osaka (JP); HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 16/096,727

(22) PCT Filed: Mar. 30, 2017

(86) PCT No.: PCT/JP2017/013368
§ 371 (c)(1),
(2) Date: Oct. 26, 2018

(87) PCT Pub. No.: WO2017/187882
PCT Pub. Date: Nov. 2, 2017

(65) Prior Publication Data
US 2019/0156664 A1 May 23, 2019

(30) Foreign Application Priority Data

Apr. 28, 2016 (JP) ................................ 2016-090260

(51) Int. Cl.
*G08G 1/01* (2006.01)
*G08G 1/0967* (2006.01)
(Continued)

(52) U.S. Cl.
CPC ......... *G08G 1/0145* (2013.01); *G08G 1/0112* (2013.01); *G08G 1/0129* (2013.01);
(Continued)

(58) Field of Classification Search
CPC ........... G08G 1/0145; G08G 1/096725; G08G 1/0129; G08G 1/0112; G08G 1/096888;
(Continued)

(56) References Cited

U.S. PATENT DOCUMENTS

2013/0275033 A1* 10/2013 Bastiaensen ........... G01C 21/26
701/119

FOREIGN PATENT DOCUMENTS

JP H10-300493 A 11/1998
JP 2009-47491 A 3/2009
(Continued)

*Primary Examiner* — Brian P Sweeney
(74) *Attorney, Agent, or Firm* — Faegre Drinker Biddle & Reath LLP

(57) ABSTRACT

A driving safety support system according to one aspect of the present disclosure includes a server, and a safety driving assistant device. The server performs operations including: acquiring, from probe vehicles, probe information including information of a time within a predetermined time period and a position of the corresponding probe vehicle at the time; calculating, based on the probe information, a traffic congestion tail position located upstream of a branch point at which a road branches into a plurality of lanes; and calculating a lane-change recommendation section in which a lane change is recommended based on the traffic congestion tail position. The safety driving assistant device performs operations including executing a driving safety support process for a target vehicle based on the lane-change recommendation section.

11 Claims, 18 Drawing Sheets

(51) Int. Cl.
*G08G 1/0968* (2006.01)
*G05D 1/02* (2020.01)

(52) U.S. Cl.
CPC ..... *G08G 1/0133* (2013.01); *G08G 1/096725* (2013.01); *G08G 1/096811* (2013.01); *G08G 1/096888* (2013.01); *G05D 1/0212* (2013.01); *G05D 2201/0213* (2013.01)

(58) Field of Classification Search
CPC ........... G08G 1/096811; G08G 1/0133; G05D 1/0212; G05D 2201/0213
USPC ....................................................... 701/118
See application file for complete search history.

(56) References Cited

FOREIGN PATENT DOCUMENTS

| | | | |
|---|---|---|---|
| JP | 2010-066001 A | * | 3/2010 |
| JP | 2010-66001 A | | 3/2010 |
| JP | 2011-94983 A | | 5/2011 |
| JP | 2014-502724 A | | 2/2014 |
| JP | 2015-161967 A | | 9/2015 |
| JP | 2015-161968 A | | 9/2015 |
| JP | 2015-170112 A | | 9/2015 |

* cited by examiner

SAFETY DRIVING ASSISTANT SYSTEM, SERVER, VEHICLE AND PROGRAM

TECHNICAL FIELD

The present disclosure relates to safety driving assistant systems, servers, vehicles, and programs.

This application claims priority on Japanese Patent Application No. 2016-90260 filed on Apr. 28, 2016, the entire contents of which are incorporated herein by reference.

BACKGROUND ART

Conventionally, in order to avoid a situation that a vehicle cannot enter a target route through a branch point because of a traffic congestion, a navigation device has been proposed which provides the driver of the vehicle with information indicating that the road ahead is congested, before the vehicle reaches the branch point (refer to Patent Literatures 1 and 2, for example).

CITATION LIST

Patent Literature

PATENT LITERATURE 1: Japanese Laid-Open Patent Publication No. 2009-47491
PATENT LITERATURE 2: Japanese Laid-Open Patent Publication No. 2011-94983
PATENT LITERATURE 3: Japanese Laid-Open Patent Publication No. H10-300493
PATENT LITERATURE 4: Japanese Laid-Open Patent Publication No. 2015-161967
PATENT LITERATURE 5: Japanese Laid-Open Patent Publication No. 2015-161968

SUMMARY OF INVENTION

A safety driving assistant system according to one aspect of the present disclosure includes a server, and a target vehicle receiving safety driving assistance. The server includes: an acquisition unit configured to acquire, from probe vehicles, probe information including information of a time within a predetermined time period and a position of the corresponding probe vehicle at the time; and a tail position calculation unit configured to calculate, based on the probe information acquired by the acquisition unit, a traffic congestion tail position located upstream of a branch point at which a road branches into a plurality of lanes. The safety driving assistant system further includes a recommendation section calculation unit configured to calculate a lane-change recommendation section in which a lane change is recommended, based on the traffic congestion tail position calculated by the tail position calculation unit. The target vehicle includes a safety driving assistant unit configured to execute a safety driving assistant process for the target vehicle, based on the lane-change recommendation section calculated by the recommendation section calculation unit.

A server according to another aspect of the present disclosure includes: an acquisition unit configured to acquire, from probe vehicles, probe information including information of a time within a predetermined time period and a position of the corresponding probe vehicle at the time; a tail position calculation unit configured to calculate, based on the probe information acquired by the acquisition unit, a traffic congestion tail position located upstream of a branch point at which a road branches into a plurality of lanes; a recommendation section calculation unit configured to calculate a lane-change recommendation section in which a lane change is recommended, based on the traffic congestion tail position calculated by the tail position calculation unit; and a provision unit configured to provide information of the lane-change recommendation section calculated by the recommendation section calculation unit, to a target vehicle receiving safety driving assistance, or a driver of the target vehicle.

A vehicle according to still another aspect of the present disclosure includes: an acquisition unit configured to acquire, from a server, information of a traffic congestion tail position located upstream of a branch point at which a road branches into a plurality of lanes, the traffic congestion tail position being calculated based on probe information, including information of a time within a predetermined time period and a position of the corresponding probe vehicle at the time; a recommendation section calculation unit configured to calculate a lane-change recommendation section in which a lane change is recommended, based on the information of the traffic congestion tail position acquired by the acquisition unit; and a safety driving assistant unit configured to execute a safety driving assistant process for the vehicle, based on the lane-change recommendation section calculated by the recommendation section calculation unit.

Not limited to the safety driving assistant system, the server, and the vehicle each including the aforementioned characteristic processing units, yet another aspect of the present disclosure can be implemented as a safety driving assistant method including process steps to be executed by the characteristic processing units included in the safety driving assistant system, the server, and the vehicle. In addition, a further aspect of the present disclosure can be implemented as a program for causing a computer to function as the characteristic processing units included in the safety driving assistant system, the server, or the vehicle, or as a program for causing a computer to execute the characteristic process steps included in the safety driving assistant method. It is needless to say that such a program can be distributed through a computer-readable non-transitory recording medium such as a CD-ROM (Compact Disc-Read Only Memory), or a communication network such as the Internet. A still further aspect of the present disclosure can be implemented as a semiconductor integrated circuit that realizes a part or the entirety of the safety driving assistant system, the server, or the vehicle.

DESCRIPTION OF EMBODIMENTS

Technical Problem

Figure 1:
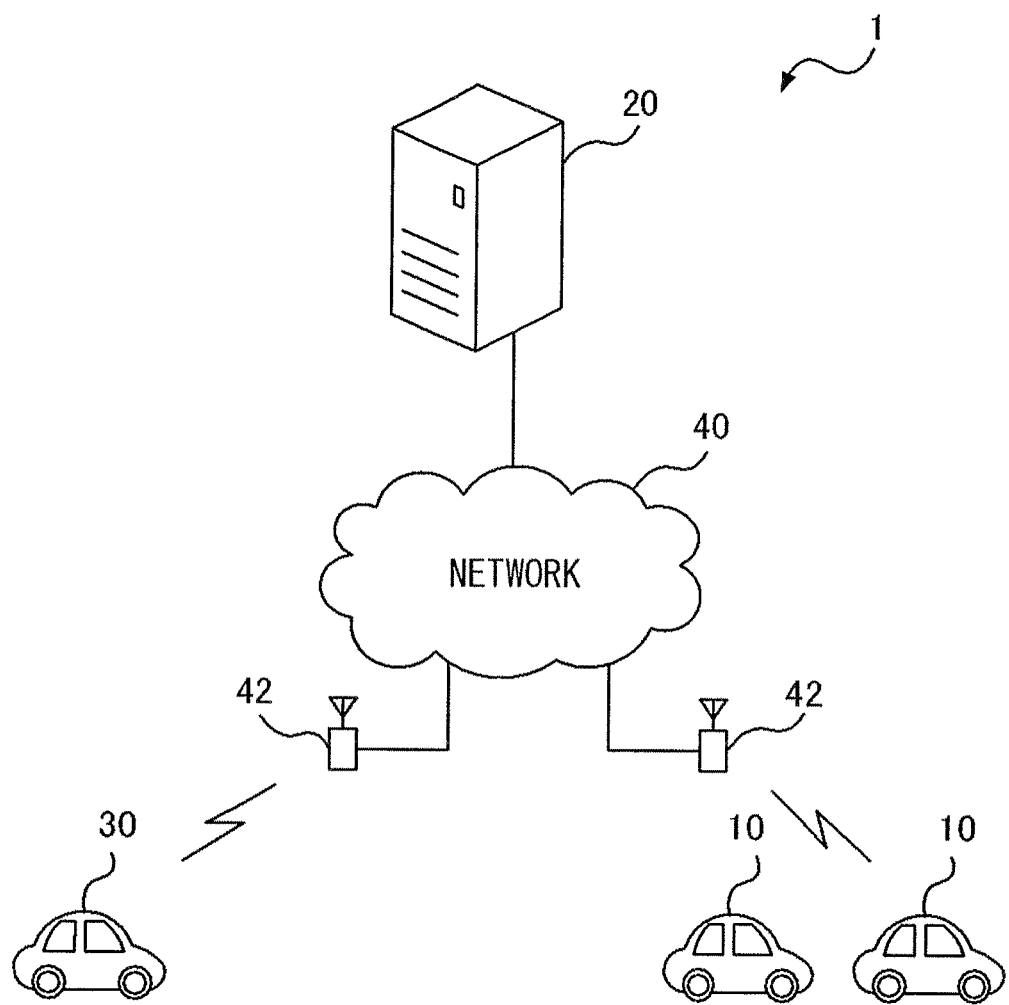
FIG. 1 is a diagram showing a configuration of a safety driving assistant system according to a first embodiment of the present disclosure.

In Patent Literature 1, a traffic congestion is determined based on statistical traffic information collected in the past. Therefore, traffic congestion that has suddenly occurred cannot be determined.

In Patent Literature 2, a traffic congestion is determined based on a measurement result from a roadside apparatus that photographs the road and measures the number of vehicles present on the road. Therefore, a traffic congestion cannot be determined when no measurement result is obtained from the roadside apparatus, or in an area where no roadside apparatus is installed.

Therefore, in one aspect of the present disclosure, it is an object of the present disclosure to provide a safety driving assistant system, a server, a vehicle, and a program which are able to determine traffic congestion that suddenly occurs in an arbitrary spot, and assist safe driving of a vehicle that has avoided the traffic congestion.

Advantageous Effects of Disclosure

According to the present disclosure, it is possible to determine traffic congestion that suddenly occurs in an arbitrary spot, and assist safe driving of a vehicle that has avoided the traffic congestion.

DESCRIPTION OF EMBODIMENTS

First, contents of embodiments of the present disclosure will be listed and described.

A safety driving assistant system according to one aspect of the present disclosure includes a server, and a target vehicle receiving safety driving assistance. The server includes: an acquisition unit configured to acquire, from probe vehicles, probe information including information of a time within a predetermined time period and a position of the corresponding probe vehicle at the time; and a tail position calculation unit configured to calculate, based on the probe information acquired by the acquisition unit, a traffic congestion tail position located upstream of a branch point at which a road branches into a plurality of lanes. The safety driving assistant system further includes a recommendation section calculation unit configured to calculate a lane-change recommendation section in which a lane change is recommended, based on the traffic congestion tail position calculated by the tail position calculation unit. The target vehicle includes a safety driving assistant unit configured to execute a safety driving assistant process for the target vehicle, based on the lane-change recommendation section calculated by the recommendation section calculation unit.

According to this configuration, the traffic congestion tail position is calculated based on the probe information. The probe information can be acquired from the probe vehicle traveling on the road within the predetermined time period. Therefore, a traffic congestion that suddenly occurs can be determined, and traffic congestion that occurs in an arbitrary spot can be determined. Further, the lane-change recommendation section is calculated based on the traffic congestion tail position. Therefore, the driver of the target vehicle or the automatic traveling target vehicle can be instructed to make a lane change according to need, before the target vehicle arrives at the traffic congestion tail position. Thus, safety driving assistance, such as causing the target vehicle to avoid a traffic congestion, can be realized.

Preferably, the server further includes a discrimination unit configured to discriminate a course of probe vehicle after branching off at the branch point, based on the probe information acquired by the acquisition unit. The tail position calculation unit calculates the traffic congestion tail position, for each course discriminated by the discrimination unit, based on the probe information of the probe vehicle traveling on the course. The recommendation section calculation unit calculates the lane-change recommendation section, for each course discriminated by the discrimination unit, based on the traffic congestion tail position regarding the course. The safety driving assistant unit executes the safety driving assistant process for the target vehicle, based on the lane-change recommendation section, for each course, calculated by the recommendation section calculation unit.

According to this configuration, the course of each probe vehicle is discriminated based on the probe information, and the traffic congestion tail position and the lane-change recommendation section are calculated for each course. Therefore, when traffic congestion occurs due to probe vehicles advancing to a target branch point, the driver or the automatic traveling target vehicle can be instructed to follow the tail of the congestion in advance in order to branch off at the branch point. Thus, safety driving assistance to prevent the target vehicle from forcefully cutting into the congestion line, and cause the target vehicle to advance toward the target branch point, can be performed.

Preferably, the server further includes a discrimination unit configured to discriminate a lane on which each probe vehicle travels, based on the probe information acquired by the acquisition unit. The tail position calculation unit calculates the traffic congestion tail position, for each lane discriminated by the discrimination unit, based on the probe information of the probe vehicle traveling on the lane. The recommendation section calculation unit calculates the lane-change recommendation section, for each lane discriminated by the discrimination unit, based on the traffic congestion tail position regarding the lane. The safety driving assistant unit executes the safety driving assistant process for the target vehicle, based on the lane-change recommendation section, for each lane, calculated by the recommendation section calculation unit.

According to this configuration, the lane on which each probe vehicle travels is discriminated based on the probe information, and the traffic congestion tail position and the lane-change recommendation section are calculated for each lane. Therefore, it is possible to recommend the driver of the target vehicle traveling on a congested lane to make a lane change to a non-congested lane, or make a lane change in advance to a congested lane connected to a target branch point. Thus, safety traveling of the target vehicle can be supported.

Preferably, in a case where at least one of the plurality of lanes is congested while at least one of the rest lanes is not congested, the safety driving assistant unit executes the safety driving assistant process that differs depending on the advancing direction of the target vehicle.

According to this configuration, the safety driving assistant process can be made different for each lane on which the target vehicle travels. Thus, traveling according to the lane congestion state can be supported.

Preferably, when the target vehicle traveling on the congested lane advances ahead on the congested lane, the safety driving assistant unit executes an assistant process for causing the target vehicle to decelerate and follow the tail of the congestion.

According to this configuration, the target vehicle can safely join the end of the congestion line of vehicles.

Preferably, when the target vehicle traveling on the congested lane enters the non-congested lane, the safety driving assistant unit executes an assistant process for causing the target vehicle to make a lane change in the lane-change recommendation section.

According to this configuration, a lane change of the target vehicle in the lane-change recommendation section can be supported. Thus, the target vehicle is prevented from being caught in the traffic congestion, and missing the timing of a lane change.

Preferably, the tail position calculation unit calculates the traffic congestion tail position by preferentially using probe information acquired from a lane identifiable vehicle capable of identifying a traveling lane thereof, among pieces of the probe information acquired by the acquisition unit. The recommendation section calculation unit calculates the lane-change recommendation section, based on the traffic congestion tail position calculated by preferentially using the probe information acquired from the lane identifiable vehicle.

The lane identifiable vehicle represented by an automatic traveling vehicle is provided with various sensors such as a camera and a radar device for observing the surrounding situations, and is designed to perform safe driving at all times. Therefore, it is considered that the traffic congestion tail position and the lane-change recommendation section, which are calculated by preferentially using the probe information of the lane identifiable vehicle that does not perform unreasonable driving, are highly reliable. According to this configuration, the reliability of the traffic congestion tail position and the lane-change recommendation section can be enhanced, thereby supporting safer driving of the target vehicle.

Preferably, the recommendation section calculation unit further searches for a non-congested section where traffic is not congested, on the upstream side of the traffic congestion tail position calculated by the tail position calculation unit, and calculates the lane-change recommendation section based on the searched non-congested section.

Even on the upstream side of the traffic congestion tail position, the road link near the traffic congestion tail position is somewhat congested with vehicles that intend to safely follow the traffic congestion tail position. Therefore, if the target vehicle makes a lane change from the congested road link to an adjacent lane that is not congested, the target vehicle may collide with a vehicle traveling on the adjacent lane at a normal speed. According to this configuration, the lane-change recommendation section is calculated based on the non-congested section. Therefore, the target vehicle can be instructed to make a lane change at a safe position, thereby supporting safer driving.

A server according to another aspect of the present disclosure includes: an acquisition unit configured to acquire, from probe vehicles, probe information including information of a time within a predetermined time period and a position of the corresponding probe vehicle at the time; a tail position calculation unit configured to calculate, based on the probe information acquired by the acquisition unit, a traffic congestion tail position located upstream of a branch point at which a road branches into a plurality of lanes; a recommendation section calculation unit configured to calculate a lane-change recommendation section in which a lane change is recommended, based on the traffic congestion tail position calculated by the tail position calculation unit; and a provision unit configured to provide information of the lane-change recommendation section calculated by the recommendation section calculation unit, to a target vehicle receiving safety driving assistance, or a driver of the target vehicle.

According to this configuration, the traffic congestion tail position is calculated based on the probe information. The probe information can be acquired from the probe vehicle traveling on the road within the predetermined time period. Therefore, traffic congestion that suddenly occurs can be determined, and traffic congestion that occurs in an arbitrary spot can be determined. Further, the lane-change recommendation section is calculated based on the traffic congestion tail position. Therefore, the driver of the target vehicle or the automatic traveling target vehicle can be instructed to make a lane change according to need, before the target vehicle arrives at the traffic congestion tail position. Thus, safety driving assistance, such as causing the target vehicle to avoid traffic congestion, can be performed.

A vehicle according to still another aspect of the present disclosure includes: an acquisition unit configured to acquire, from a server, information of a traffic congestion tail position located upstream of a branch point at which a road branches into a plurality of lanes, the traffic congestion tail position being calculated based on probe information, including information of a time within a predetermined time period and a position of the corresponding probe vehicle at the time; a recommendation section calculation unit configured to calculate a lane-change recommendation section in which a lane change is recommended, based on the information of the traffic congestion tail position acquired by the acquisition unit; and a safety driving assistant unit configured to execute a safety driving assistant process for the vehicle, based on the lane-change recommendation section calculated by the recommendation section calculation unit.

According to this configuration, the traffic congestion tail position is calculated based on the probe information. The probe information can be acquired from the probe vehicle traveling on the road within the predetermined time period. Therefore, traffic congestion that suddenly occurs can be determined, and traffic congestion that occurs in an arbitrary spot can be determined. Further, the lane-change recommendation section is calculated based on the traffic congestion tail position. Therefore, before arriving at the traffic congestion tail position, the driver of the vehicle or the automatic traveling vehicle can make a lane change or the like according to need, thereby performing safety driving assistance for avoiding the traffic congestion.

A vehicle according to yet another aspect of the present disclosure includes: an acquisition unit configured to acquire information of a lane-change recommendation section in which a lane change is recommended, the lane-change recommendation section being calculated based on information of a traffic congestion tail position located upstream of a branch point at which a road branches into a plurality of lanes, the traffic congestion tail position being calculated based on probe information, including information of a time within a predetermined time period and a position of the corresponding probe vehicle at the time; and a safety driving assistant unit configured to execute a safety driving assistant process for the vehicle, based on the information of the lane-change recommendation section acquired by the acquisition unit.

According to this configuration, the traffic congestion tail position is calculated based on the probe information. The probe information can be acquired from the probe vehicle traveling on the road within the predetermined time period. Therefore, traffic congestion that suddenly occurs can be determined, and traffic congestion that occurs in an arbitrary spot can be determined. Further, the lane-change recommendation section is calculated based on the traffic congestion tail position. Therefore, before arriving at the traffic congestion tail position, the driver of the vehicle or the automatic traveling vehicle can perform a lane change or the like according to need, thereby performing safety driving assistance for avoiding the traffic congestion.

A program according to a further aspect of the present disclosure causes a computer to function as: an acquisition unit configured to acquire, from probe vehicles, probe information including information of a time within a predetermined time period and a position of the corresponding probe vehicle at the time; a tail position calculation unit configured to calculate, based on the probe information acquired by the acquisition unit, a traffic congestion tail position located upstream of a branch point at which a road branches into a plurality of lanes; a recommendation section calculation unit configured to calculate a lane-change recommendation section in which a lane change is recommended, based on the traffic congestion tail position calculated by the tail position calculation unit; and a provision unit configured to provide information of the lane-change recommendation section calculated by the recommendation section calculation unit, to a target vehicle receiving safety driving assistance, or a driver of the target vehicle.

This configuration is the same as the configuration of the aforementioned server. Therefore, the same operation and effect as those of the server are achieved.

A program according to a still further aspect of the present disclosure causes a computer to function as: an acquisition unit configured to acquire, from a server, information of a traffic congestion tail position located upstream of a branch point at which a road branches into a plurality of lanes, the traffic congestion tail position being calculated based on probe information, including information of a time within a predetermined time period and a position of a probe vehicle at the time; a recommendation section calculation unit configured to calculate a lane-change recommendation section in which a lane change is recommended, based on the information of the traffic congestion tail position acquired by the acquisition unit; and a safety driving assistant unit configured to execute a safety driving assistant process for an own vehicle, based on the lane-change recommendation section calculated by the recommendation section calculation unit.

This configuration is the same as the configuration of the aforementioned vehicle. Therefore, the same operation and effect as those of the vehicle are achieved.

A program according to a yet further aspect of the present disclosure causes a computer to function as: an acquisition unit configured to acquire information of a lane-change recommendation section in which a lane change is recommended, the lane-change recommendation section being calculated based on information of a traffic congestion tail position located upstream of a branch point at which a road branches into a plurality of lanes, the traffic congestion tail position being calculated based on probe information, including information of a time within a predetermined time period and a position of the corresponding probe vehicle at the time; and a safety driving assistant unit configured to execute a safety driving assistant process for an own vehicle, based on the information of the lane-change recommendation section acquired by the acquisition unit.

This configuration is the same as the configuration of the aforementioned vehicle. Therefore, the same operation and effect as those of the vehicle are achieved.

Detailed Description of Embodiments

Hereinafter, embodiments of the present disclosure will be described in detail with reference to the drawings. It is to be noted that each of the embodiments described below shows a preferable and specific example of the present disclosure. Numerical values, shapes, components, arrangement and connection configuration of the components, steps, processing order of the steps, etc., shown in the following embodiments are merely examples, and are not intended to limit the scope of the present disclosure. The present disclosure is specified in claims. Therefore, among the components in the following embodiments, components not recited in any one of independent claims defining the most generic concept of the present disclosure are not necessarily required to achieve the objects of the present disclosure, but are used to form preferable embodiments.

At least some parts of the embodiments described below may be combined together as appropriate.

First Embodiment 1-1. Overall Configuration of System

FIG. 1 is a diagram showing a configuration of a safety driving assistant system according to a first embodiment of the present disclosure.

With reference to FIG. 1, a safety driving assistant system 1 is a system for assisting safety driving of a target vehicle traveling on a road, and includes a server 20 and a target vehicle 30.

The server 20 receives probe information from probe vehicles 10, and calculates, based on the received probe information, a lane-change recommendation section which allows a safety lane change when traffic congestion occurs. The server 20 provides information of the calculated lane-change recommendation section to the target vehicle 30 which receives safety driving assistance or to the driver of the target vehicle 30 through a network 40 and a wireless base station 42.

The target vehicle 30 is an ordinary vehicle driven by a driver or an automatic traveling vehicle (self-driving car).

The target vehicle 30 receives the information of the lane-change recommendation section, which is provided from the server 20, and executes a safety driving assistant process for the target vehicle 30, based on the received information. That is, the target vehicle 30 displays the information of the lane-change recommendation section on a display screen of a navigation device. When the target vehicle 30 is an automatic traveling vehicle, the target vehicle 30 makes a lane change in the lane-change section, according to need.

Each probe vehicle 10 generates, at predetermined time intervals (e.g., 3-second intervals), probe information including at least information of the position where the probe vehicle 10 travels and information of the time at which the probe vehicle 10 travels at the position. The probe vehicle 10 transmits the generated probe information to the server 20 via a wireless base station 42 and a network 40. Transmission of the probe information to the server 20 may be performed in real time, or may be performed at predetermined time intervals or at a time when a predetermined number of pieces of probe information have been collected. The network 40 may be a public communication network such as the Internet or a mobile phone network, or may be a private communication network.

1-2. Configuration of Probe Vehicle 10

Figure 2:
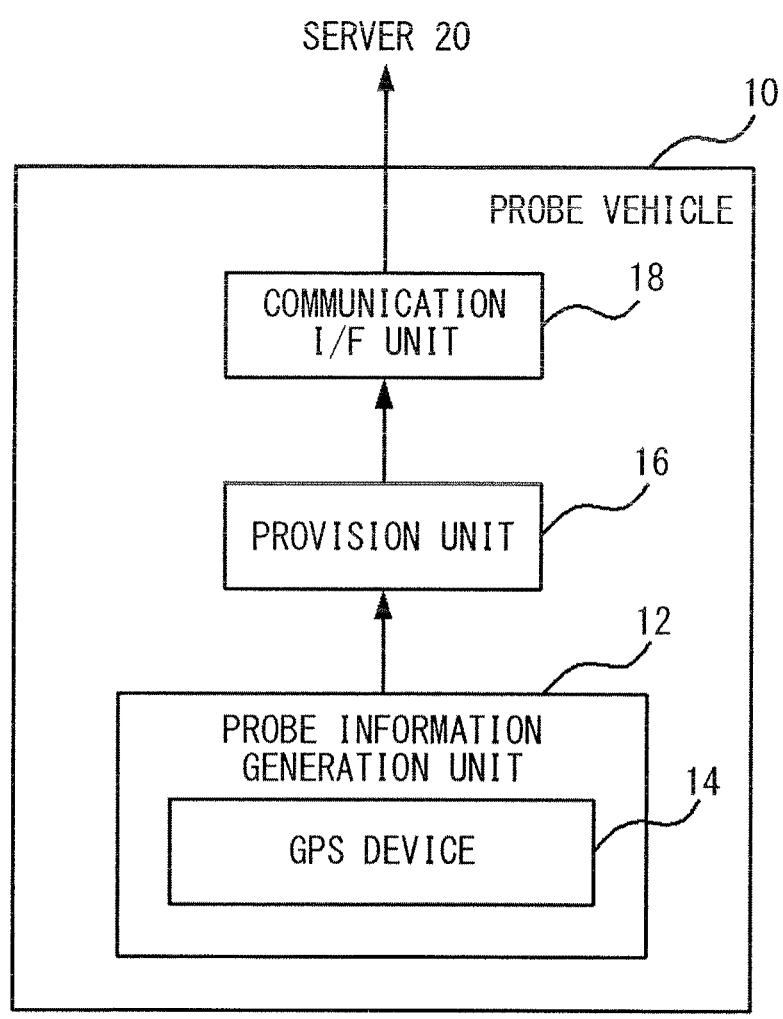
FIG. 2 is a block diagram showing a functional configuration of a probe vehicle.

FIG. 2 is a block diagram showing a functional configuration of the probe vehicle 10. FIG. 2 shows only processing units relating to generation of probe information, while illustration of processing units relating to traveling of the probe vehicle 10 is omitted.

The probe vehicle 10 includes a probe information generation unit 12, a provision unit 16, and a communication I/F (interface) unit 18. The probe information generation unit 12 and the provision unit 16 are implemented by a processor that performs digital signal processing, such as a CPU (Central Processing Unit) or an MPU (Micro-Processing Unit). These units 12 and 16 may be implemented by a single processor, or may be implemented by separate processors.

The probe information generation unit 12 is configured to include a GPS (Global Positioning System) device 14. The probe information generation unit 12 generates, at predetermined time intervals, probe information including at least information of the position of the probe vehicle 10 measured by the GPS device 14 and information of the time at which the probe vehicle 10 travels at the position. The positional information of the probe vehicle 10 includes movement information and latitude information.

The provision unit 16 transmits the probe information generated by the probe information generation unit 12 through the communication I/F unit 18, thereby providing the probe information to the server 20. As described above, the probe information may be transmitted one by one in real time, or a plurality of pieces of probe information may be transmitted in a batch.

The communication I/F unit 18 is a communication interface for wirelessly transmitting data, and is implemented by a wireless module or the like.

The probe information generation unit 12, the provision unit 16, and the communication I/F unit 18 shown in FIG. 2 may be implemented by a dedicated probe terminal, or may be implemented by a general terminal such as a smart phone used by the driver of the probe vehicle 10.

1-3. Configuration of Server 20

Figure 3:
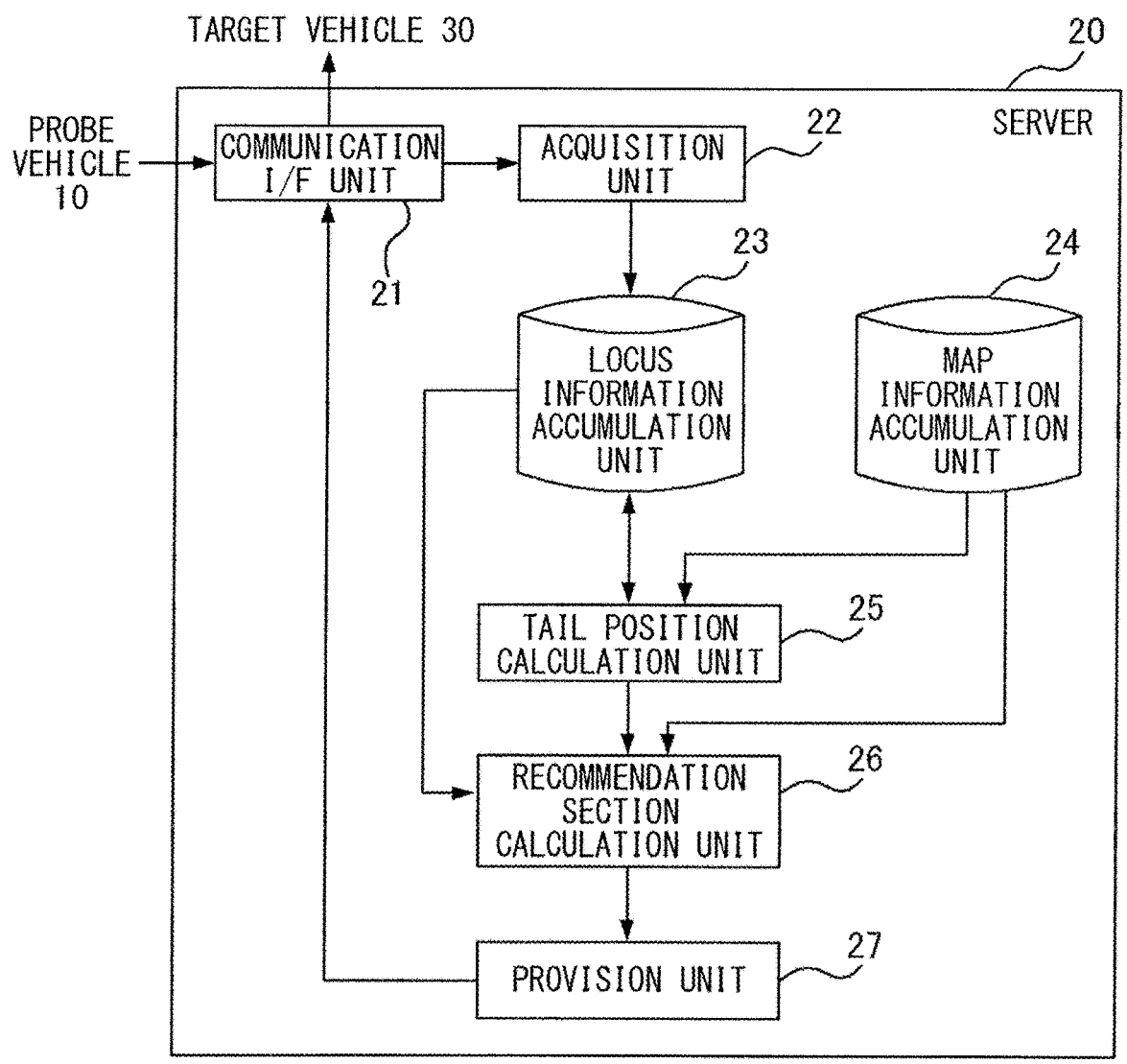
FIG. 3 is a block diagram showing a functional configuration of a server.

FIG. 3 is a block diagram showing a functional configuration of the server 20. The server 20 is a computer including: a processor that performs digital signal processing, such as a CPU or an MPU; an RAM (Random Access Memory); an ROM (Read Only Memory), and the like.

With reference to FIG. 3, the server 20 includes a communication I/F unit 21, an acquisition unit 22, a locus information accumulation unit 23, a map information accumulation unit 24, a tail position calculation unit 25, a recommendation section calculation unit 26, and a provision unit 27. The acquisition unit 22, the tail position calculation unit 25, the recommendation section calculation unit 26, and the provision unit 27 are implemented by a processor such as a CPU. These units 22, 25, 26, and 27 may be implemented by a single processor, or may be implemented by separate processors.

The communication I/F unit 21 is a communication interface for wirelessly exchanging data with each probe vehicle 10 and the target vehicle 30. The communication I/F unit 21 is implemented by a wireless module or the like.

The acquisition unit 22 acquires the probe information from each probe vehicle 10 via the communication I/F unit 21.

The locus information accumulation unit 23 is a storage unit in which the probe information acquired by the acquisition unit 22 is accumulated, and is implemented by an HDD (Hard Disc Drive) or the like.

The map information accumulation unit 24 is a storage unit in which map information of roads on which vehicles travel is accumulated, and is implemented by an HDD or the like.

The tail position calculation unit 25 calculates a traffic congestion tail position, based on the probe information stored in the locus information accumulation unit 23 and the map information stored in the map information accumulation unit 24. That is, when the position of the probe vehicle 10 indicated by the probe information is not present on the road indicated by the map information, the tail position calculation unit 25 performs a map matching process to estimate a correct position on the road. The tail position calculation unit 25 calculates a tail position of a traffic congestion of probe vehicles 10, based on the probe information after the map matching. The tail position calculation unit 25 calculates a traffic congestion tail position on the upstream side of a branch point at which a lane branches into a plurality of lanes. The reason is as follows. By calculating a traffic congestion tail position before the branch point, safety driving assistance for the target vehicle 30 can be performed so that the target vehicle 30 can smoothly advance to a target lane without being caught in the traffic congestion.

Based on the traffic congestion tail position determined by the tail position calculation unit 25, the recommendation section calculation unit 26 calculates a lane-change recommendation section in which a lane change is recommended. The lane-change recommendation section is provided upstream of the traffic congestion tail position. Performing a lane change in the lane-change recommendation section prevents the target vehicle 30 from being late in making a lane change because of the traffic congestion. The method of calculating the lane-change recommendation section will be described later in detail.

The provision unit 27 transmits information of the lane-change recommendation section calculated by the recommendation section calculation unit 26 to the target vehicle 30 via the communication I/F unit 21. Thus, the information of the lane-change recommendation section is provided to the target vehicle 30 or the driver of the target vehicle 30.

1-4. Configuration of Target Vehicle 30

Figure 4:
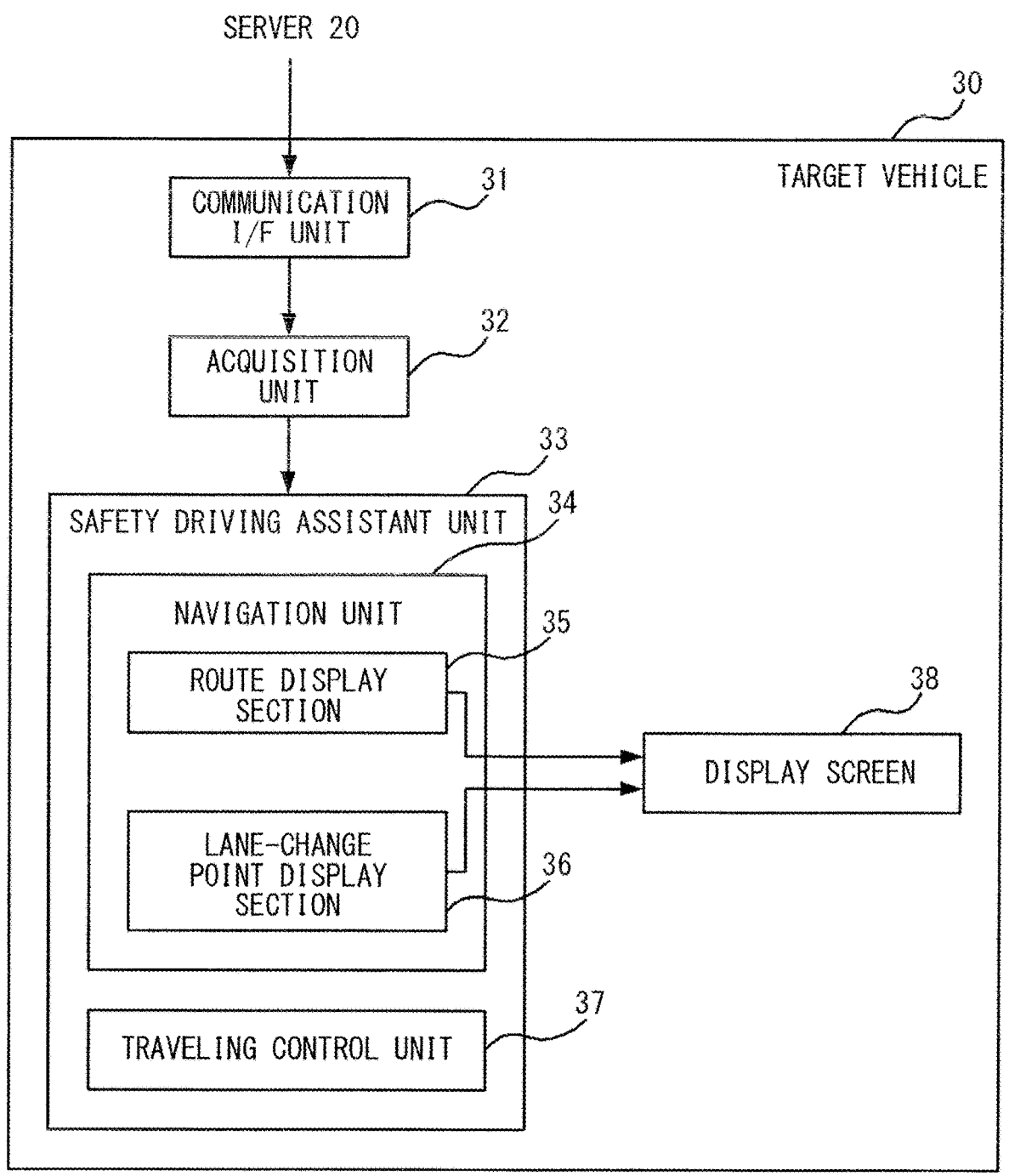
FIG. 4 is a block diagram showing a functional configuration of a target vehicle.

FIG. 4 is a block diagram showing a functional configuration of the target vehicle 30.

With reference to FIG. 4, the target vehicle 30 includes a communication I/F unit 31, an acquisition unit 32, a safety driving assistant unit 33, and a display screen 38. The acquisition unit 32 and the safety driving assistant unit 33 are implemented by, for example, a processor that performs digital signal processing, such as a CPU or an MPU. These units 32 and 33 may be implemented by a single processor, or may be implemented by separate processors.

The communication I/F unit 31 is a communication interface for wirelessly receiving data from the server 20, and is implemented by a wireless module or the like.

The acquisition unit 32 acquires the information of the lane-change recommendation section from the server 20 via the communication I/F unit 31.

The safety driving assistant unit 33 is a processing unit that performs a safety driving assistant process for the target vehicle 30, based on the information of the lane-change recommendation section acquired by the acquisition unit 32. The safety driving assistant unit 33 includes a navigation unit 34 and a traveling control unit 37. The navigation unit 34 and the traveling control unit 37 are also implemented by a processor such as a CPU or an MPU. These units 34 and 37 may be implemented by a single processor, or may be implemented by separate processors.

The display screen 38 is a display unit such as a display used for the safety driving assistant process by the safety driving assistant unit 33.

The navigation unit 34 is a processing unit that performs route guidance to a destination, for the driver of the target vehicle 30. The navigation unit 34 includes a route display section 35 and a lane-change point display section 36. The route display section 35 calculates a route to a destination, and performs control to display the route on the display screen 38. The lane-change point display section 36 performs control to display, in a visible manner, the lane-change recommendation section in the route to the destination displayed on the display screen 38. For example, the lane-change recommendation section is displayed in a color different from a color of other road sections. When the target vehicle 30 has arrived at the lane-change recommendation section, the navigation unit 34 may perform notification by voice that recommends the driver to change the lane.

The traveling control unit 37 controls an engine, a brake, steering, a direction indicator, and the like, thereby causing the target vehicle 30 to travel automatically. The traveling control unit 37 determines whether a lane change is necessary, and makes a lane change according to need, when the target vehicle 30 has arrived at the lane-change recommendation section. For example, when the target vehicle 30, which plans to exit from a main lane of a freeway, obtains information of a lane-change recommendation section while traveling on a passing lane, the target vehicle 30 performs, in the lane-change recommendation section, a lane change to a cruising lane closest to an exit in order to smoothly exit from the main lane.

1-5. Processing Flow of Server 20

Hereinafter, processing executed by the server 20 will be described in detail.

Figure 5:
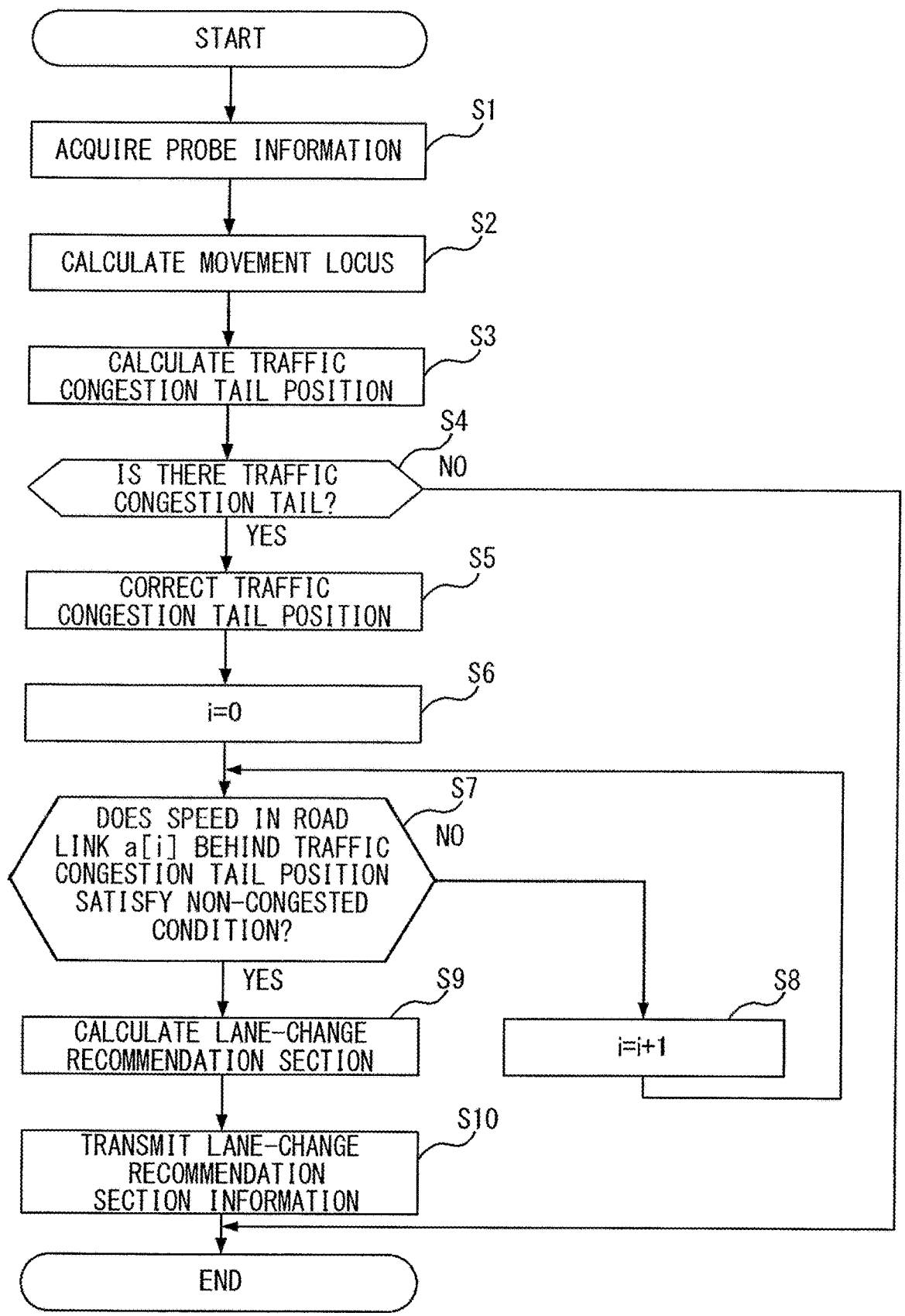
FIG. 5 is a flowchart showing a flow of processing executed by the server.
Figure 6:
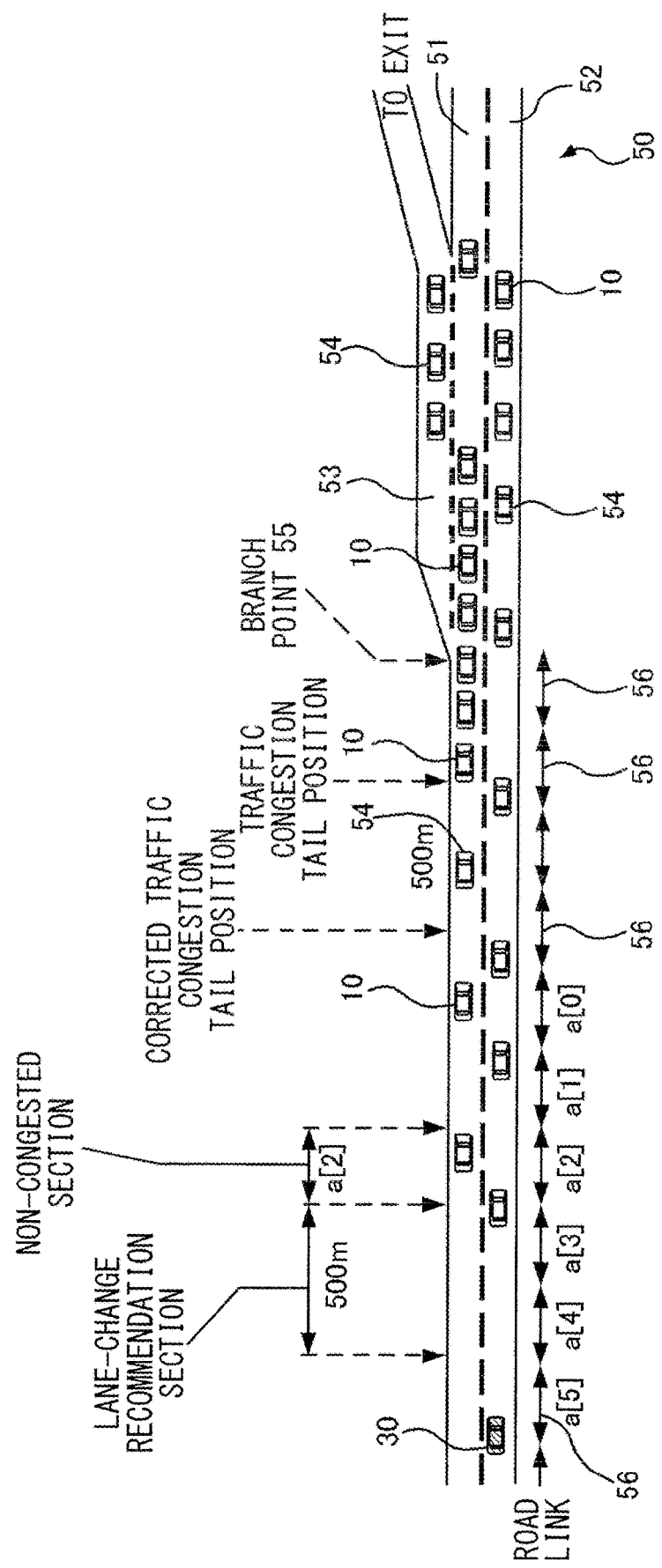
FIG. 6 is a diagram for explaining the processing executed by the server.

FIG. 5 is a flowchart showing a flow of processing executed by the server 20. FIG. 6 is a diagram for explaining the processing executed by the server 20. FIG. 6 shows a freeway 50 and a plurality of vehicles 54 traveling on the freeway. The freeway 50 consists of two main lanes, i.e., a cruising lane 51 and a passing lane 52. A deceleration lane 53 branches off from the cruising lane 51 as the main lane, and extends toward an exit of the freeway 50. The vehicles 54 traveling on the freeway 50 include probe vehicles 10 which provide probe information. A target vehicle 30 is coming from the upstream side of a branch point 55 at which the deceleration lane 53 branches off from the cruising lane 51. The freeway on the upstream side of the branch point 55 is divided into road links 56 of predetermined intervals (e.g., 100 m).

With reference to FIG. 5, the acquisition unit 22 acquires probe information including time information within a predetermined time period (e.g., 15 minutes prior to the present time) from each probe vehicle 10 via the communication I/F unit 21 (S1). The acquisition unit 22 writes the acquired probe information into the locus information accumulation unit 23.

The tail position calculation unit 25 performs the map matching process on the probe information of the probe vehicle 10 to estimate a correct position of the probe vehicle 10 on the freeway, and calculates a movement locus, of each probe vehicle 10, consisting of a set of pieces of probe information (S2). The tail position calculation unit 25 writes the calculated movement locus into the locus information accumulation unit 23.

The tail position calculation unit 25 calculates a traffic congestion tail position located upstream of the branch point 55, based on the probe information indicating the movement locus of each probe vehicle 10 stored in the locus information accumulation unit 23 (S3). For example, the tail position calculation unit 25 calculates a traffic congestion tail position from probe information of probe vehicles 10 that have traveled on the freeway 50 within a predetermined time period (e.g., 15 minutes). In a case where road links 56 in which the average speed is not higher than a predetermined speed threshold (e.g., 20 km/h) are continued on the upstream side of the probe vehicles 10, the tail position calculation unit 25 calculates, as a traffic congestion tail position, a position of a probe vehicle 10 at which the average speed is equal to the predetermined speed threshold in the most upstream side road link 56. The average speed of the probe vehicles 10 is obtained by averaging the speeds of the probe vehicles 10. The speed of each probe vehicle 10 can be calculated by calculating a movement distance per unit time, based on the information of the position of the probe vehicle and the information of the time at which the probe vehicle has passed the position, which are included in the probe information. When the speed information is included in the probe information, the average speed of each probe vehicle 10 may be calculated based on the speed information. The method of calculating a traffic congestion tail position is not limited thereto.

If no traffic congestion tail position is calculated by the tail position calculation unit 25 (NO in S4), the subsequent steps are not executed.

When a traffic congestion tail position is calculated by the tail position calculation unit 25 (YES in S4), the tail position calculation unit 25 performs correction of the traffic congestion tail position such that a position at a predetermined distance (e.g., 500 m) upstream of the traffic congestion tail position is set as a new traffic congestion tail position (S5). This is because ordinary vehicles 54 that do not transmit probe information are likely to continue behind the position of the probe vehicle 10 regarded as the traffic congestion tail position. Such positional correction can avoid a situation that traffic congestion occurs behind the traffic congestion tail position.

Based on the corrected traffic congestion tail position, the recommendation section calculation unit 26 calculates a lane-change recommendation section located upstream of the traffic congestion tail position. The calculation method will be described hereinafter. As shown in FIG. 6, the road links 56 on the upstream side of the road link 56 to which the corrected traffic congestion tail position belongs are referred to as road link a[0], road link a[1], road link a[2], and so on in order from one closest to the traffic congestion tail position.

The recommendation section calculation unit 26 substitutes 0 for a counter i (S6).

The recommendation section calculation unit 26 determines whether or not the speeds of probe vehicles 10 in road link a[i] satisfy a non-congested condition (S7). The non-congested condition is a condition indicating that probe vehicles 10 travel in a non-congested section. For example, when the average speed of the probe vehicles 10 is not lower than 60 km/h and the speed variance is not greater than 100, it is determined that the non-congested condition is satisfied. The method of determining the non-congested condition by the recommendation section calculation unit 26 is not limited thereto. For example, if the speeds of vehicles 54 can be obtained from output information of an optical beacon, an image-type vehicle sensor, or the like, determination as to whether the non-congested condition is satisfied may be performed by using the speeds of the vehicles 54 instead of the speeds of the probe vehicles 10.

The recommendation section calculation unit 26 executes the non-congested condition determination process (S7) while incrementing the counter i (S8) until the non-congested condition is satisfied.

When it is determined that the non-congested condition is satisfied (YES in S7), the recommendation section calculation unit 26 calculates, as a lane-change recommendation section, a section of a predetermined distance (e.g., 500 m) upstream of the road link that satisfies the non-congested condition (hereinafter referred to as "non-congested section") (S9). Taking into account the driver's action such as measuring the timing of a lane change, a buffer section of a predetermined distance (e.g., 500 m) may be provided between the non-congested section and the lane-change recommendation section. Thus, the driver is given a certain grace period to decide whether to perform a lane change.

The provision unit 27 transmits the information of the lane-change recommendation section calculated by the recommendation section calculation unit 26 to the target vehicle 30 (S10).

Upon receiving the information of the lane-change recommendation section, the target vehicle 30 can cause the navigation unit 34 to display the lane-change recommendation section in a visible manner, or cause the traveling control unit 37 to make a lane change in the lane-change recommendation section. For example, as shown in FIG. 6, it is assumed that the target vehicle 30 traveling on the passing lane 52 plans to head toward the deceleration lane 53 to exit from the freeway 50. At this time, the navigation unit 34 can recommend the target vehicle 30 to make a lane change to the cruising lane 51 in the lane-change recommendation section, and the traveling control unit 37 can perform lane change control to the cruising lane 51 in the lane-change recommendation section. Thus, the target vehicle 30 is prevented from missing the timing of a lane change and becoming incapable of making a lane change due to traffic congestion. On the other hand, when the target vehicle 30 plans to travel straight ahead, the driver or the traveling control unit 37 can make a decision that no lane change is made in the lane-change recommendation section and traveling on the passing lane 52 is continued. Thus, an unnecessary lane change can be avoided so as not to be caught in traffic congestion.

1-6. Effect and the Like of First Embodiment

As described above, according to the first embodiment, a traffic congestion tail position is calculated based on probe information. The probe information can be acquired from probe vehicles 10 traveling on a road within a predetermined time period. Therefore, traffic congestion that suddenly occurs can be determined, and traffic congestion that occurs in an arbitrary spot can be determined. Further, a lane-change recommendation section is calculated based on the traffic congestion tail position. Therefore, the driver of the target vehicle 30 or the automatic traveling target vehicle 30 can be instructed to make a lane change according to need, before the target vehicle 30 arrives at the traffic congestion tail position. Thus, safety driving assistance, such as causing the target vehicle 30 to make a lane change, can be performed.

Figure 7:
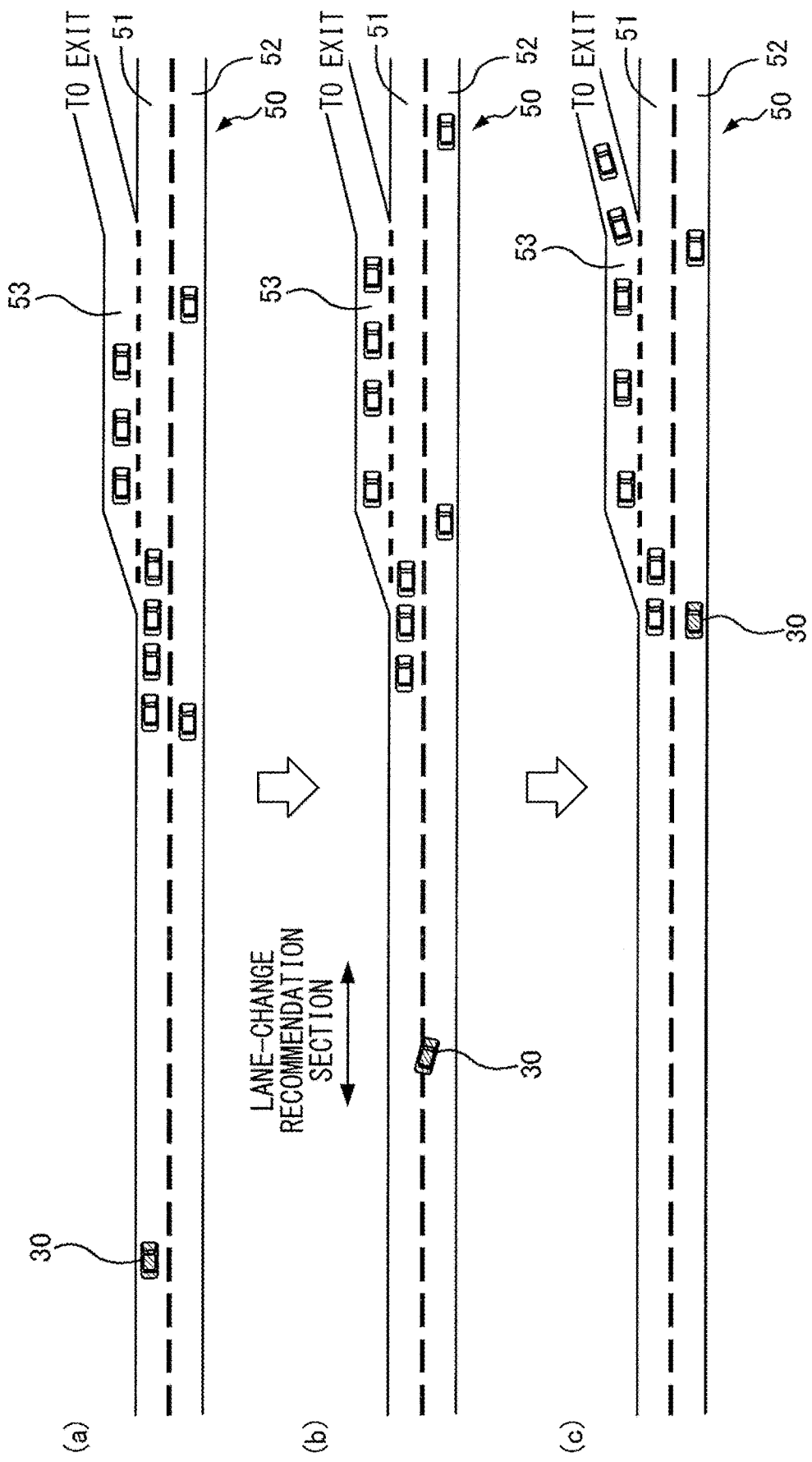
FIG. 7 is a diagram showing an example of a safety driving assistant process.

FIG. 7 shows an example of a safety driving assistant process. For example, when the target vehicle 30 traveling on the cruising lane 51 advances straight as shown in (a) of FIG. 7, an assistant process for making a lane change to the passing lane 52 in the lane-change recommendation section is performed as shown in (b) of FIG. 7. Thus, as shown in (c) of FIG. 7, the target vehicle 30 can avoid a traffic congestion on the cruising lane 51, and travel straight ahead on the passing lane 52.

Figure 8:
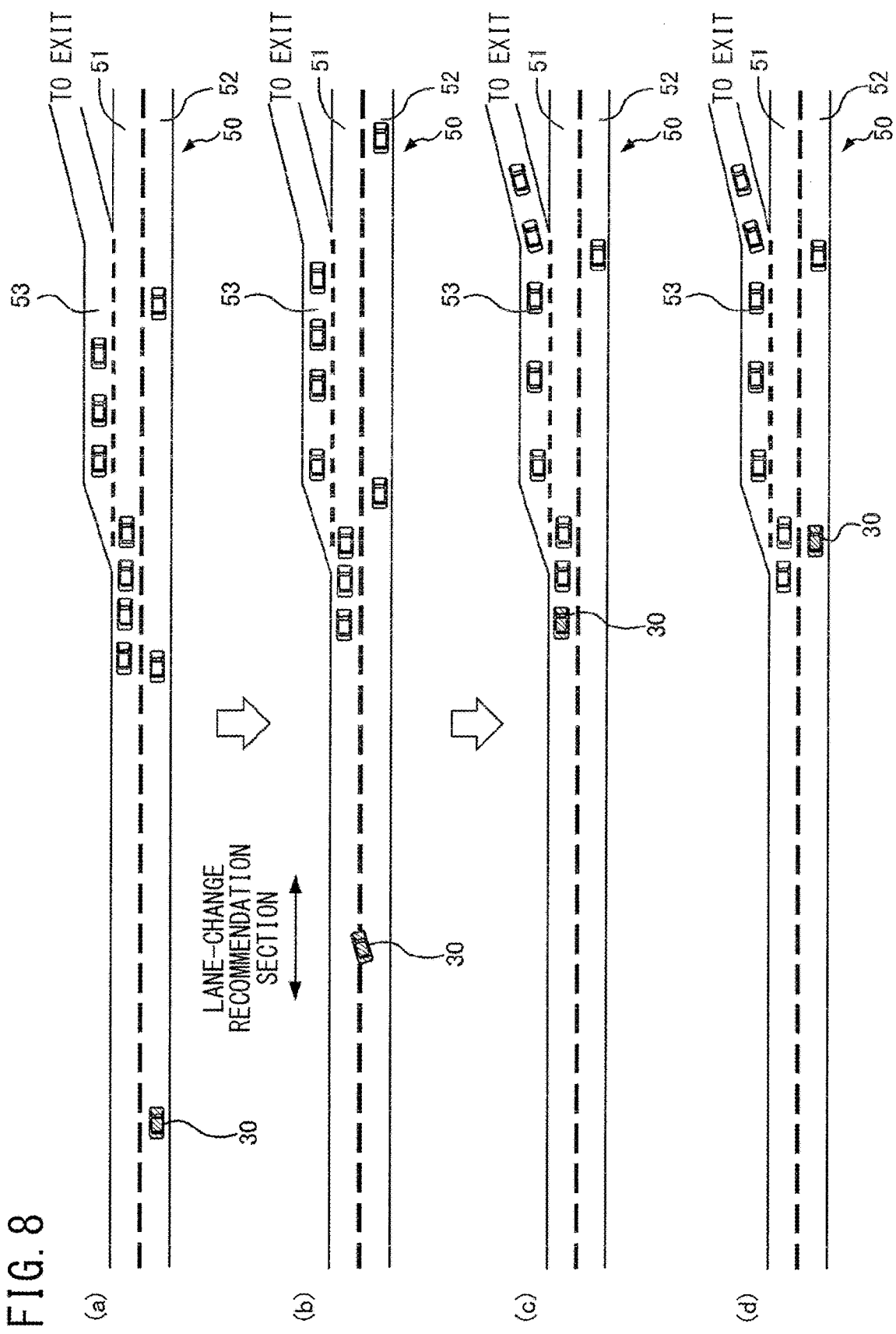
FIG. 8 is a diagram showing another example of a safety driving assistant process.

FIG. 8 shows another example of a safety driving assistant process. For example, when the target vehicle 30 traveling on the passing lane 52 advances toward the deceleration lane 53 to exit from the freeway 50 as shown in (a) of FIG. 8, control for making a lane change to the cruising lane 51 in the lane-change recommendation section is performed as shown in (b) of FIG. 8. Thus, as shown in (c) of FIG. 8, the target vehicle 30 can follow the tail of the congestion line of vehicles. Accordingly, as shown in (d) of FIG. 8, it is possible to avoid a situation that the target vehicle 30 misses the timing of a lane change, becomes incapable of making a lane change to the passing lane 52 and the deceleration lane 53, and misses the exit of the freeway.

Even on the upstream side of the traffic congestion tail position, the road link 56 near the traffic congestion tail position is somewhat congested with vehicles that intend to safely follow the traffic congestion tail position. Therefore, if the target vehicle 30 makes a lane change from the congested road link 56 to an adjacent lane that is not congested, the target vehicle 30 may collide with a vehicle traveling on the adjacent lane at a normal speed. However, the recommendation section calculation unit 26 searches for a non-congested section, and calculates a lane-change recommendation section based on the non-congested section. Therefore, the target vehicle can be instructed to make a lane change at a safe position, thereby supporting safer driving.

Second Embodiment

The second embodiment is different from the first embodiment in that a lane-change recommendation section is calculated for each of courses of probe vehicles 10. Hereinafter, the difference from the first embodiment will be mainly described while description similar to the first embodiment is omitted as appropriate.

The configuration of the safety driving assistant system according to the second embodiment is identical to the configuration of the safety driving assistant system 1 according to the first embodiment shown in FIG. 1, and therefore, detailed description thereof is not repeated.

In the second embodiment, the configuration of the server 20 is different from that of the first embodiment.

2-1. Configuration of Server 20

Figure 9:
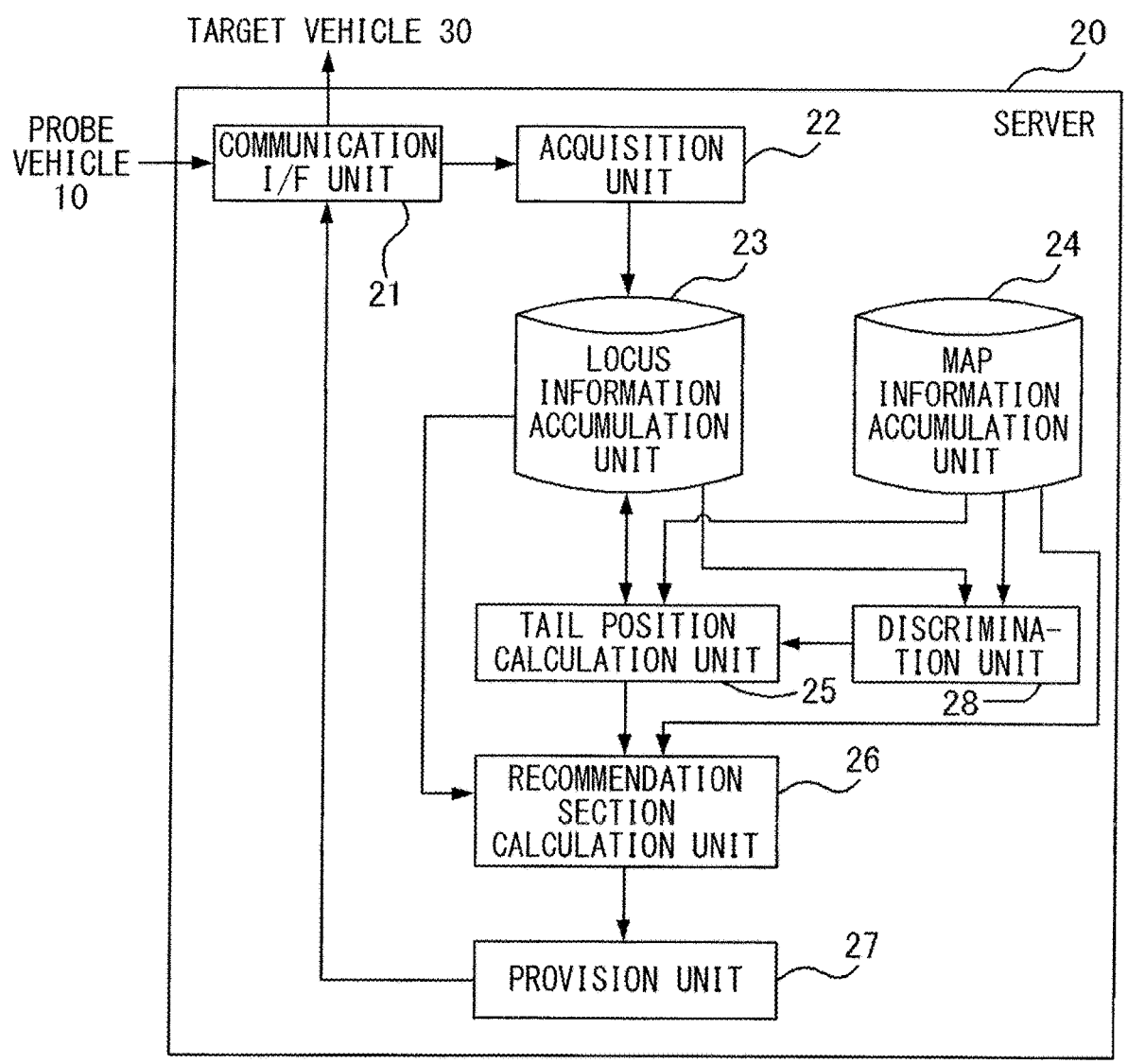
FIG. 9 is a block diagram showing a functional configuration of a server according to a second embodiment.

FIG. 9 is a block diagram showing a functional configuration of the server 20 according to the second embodiment. The server 20 shown in FIG. 9 further includes a discrimination unit 28 in the configuration of the server 20 according to the first embodiment shown in FIG. 3. The discrimination unit 28 is implemented by a processor that performs digital signal processing, such as a CPU or an MPU. The discrimination unit 28 may be implemented by a single processor, or may be implemented by a plurality of processors.

The discrimination unit 28 discriminates the course of each probe vehicle 10 after branching at a branch point, based on the probe information, after map matching, stored in the locus information accumulation unit 23. The probe information indicates the movement locus of the probe vehicle 10. Therefore, by collating the movement locus with the road map information stored in the map information accumulation unit 24, the course of the probe vehicle 10 can be discriminated. For example, on the freeway 50 shown in FIG. 6, it is possible to discriminate whether a probe vehicle 10 branches off to enter the deceleration lane 53 and advances toward the exit of the freeway 50, or the probe vehicle 10 travels straight ahead on the cruising lane 51 or the passing lane 52.

2-2. Processing Flow of Server 20

Figure 10:
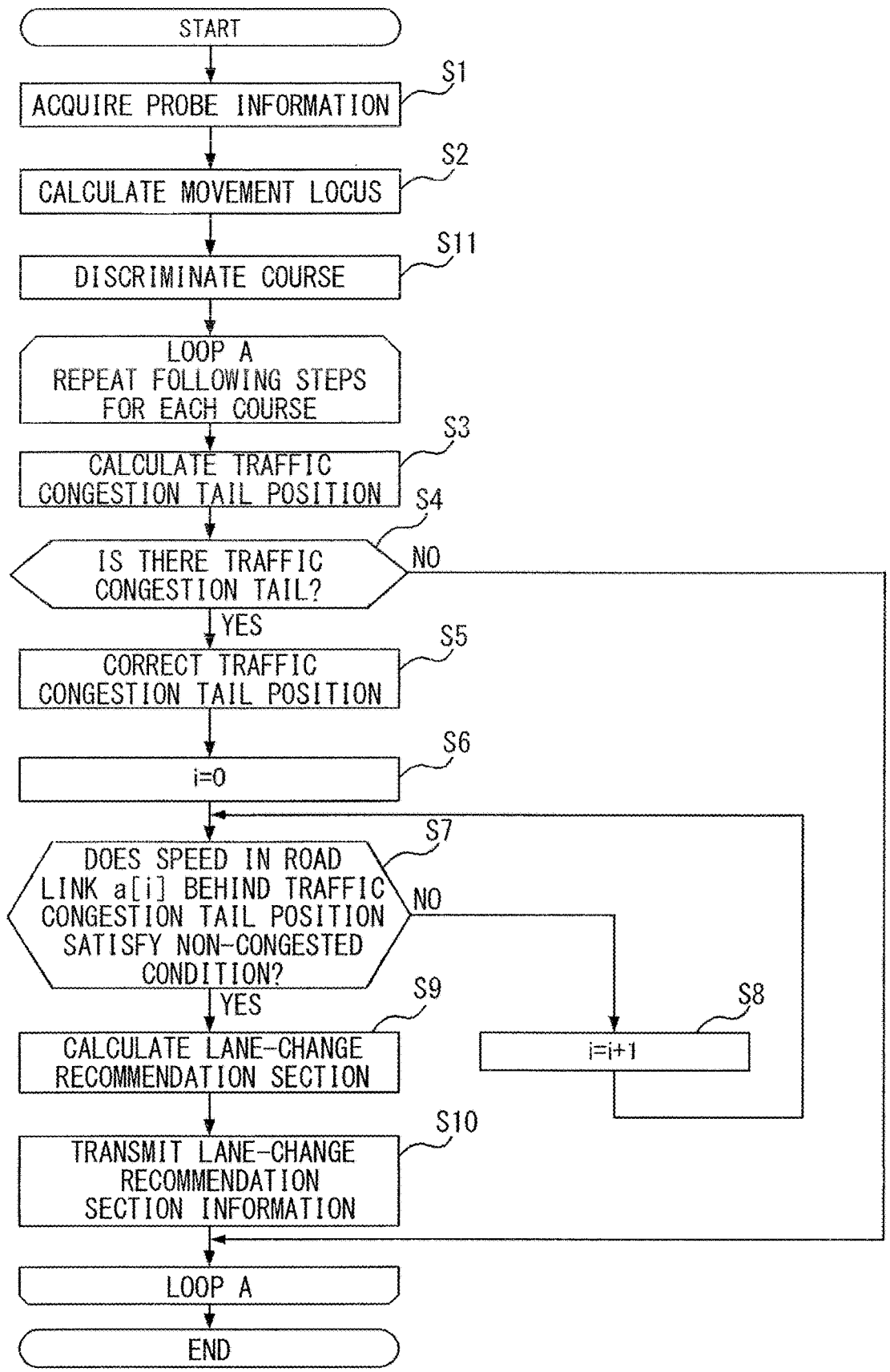
FIG. 10 is a flowchart showing a flow of processing executed by the server.
Figure 11:
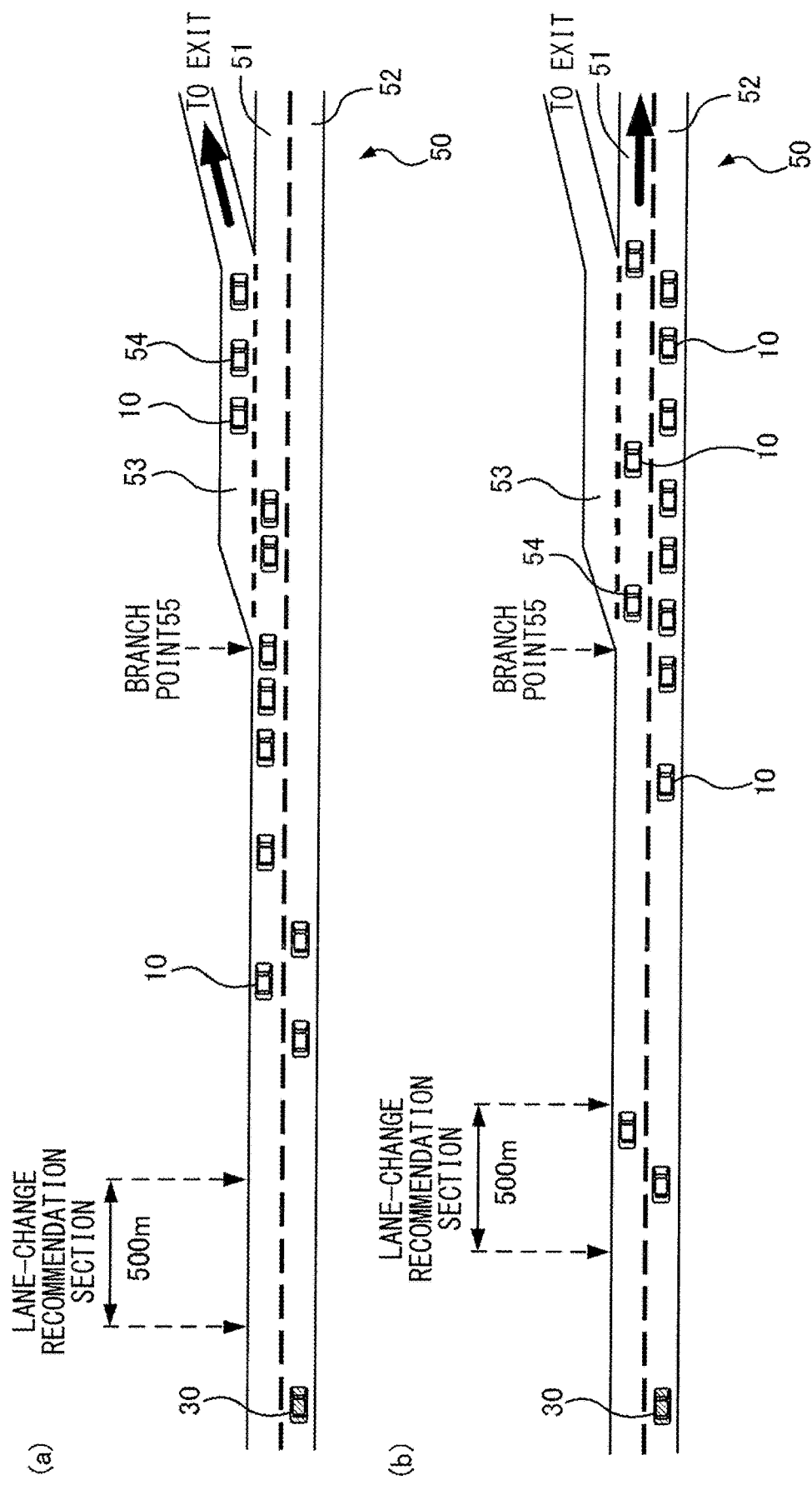
FIG. 11 is a diagram for explaining the processing executed by the server.

FIG. 10 is a flowchart showing a flow of processing executed by the server 20. FIG. 11 is a diagram for explaining the processing executed by the server 20, in which (a) shows an example of a vehicle 54 that gets off the freeway 50 and advances toward the exit, and (b) shows an example of a vehicle 54 that travels straight ahead on the freeway 50.

With reference to FIG. 10, the processes in steps S1 to S10 are the same as those shown in FIG. 5.

After the movement locus calculating process (S2), the discrimination unit 28 discriminates, based on probe information, the course of each probe vehicle 10 that has traveled on the freeway 50 within a predetermined time period (e.g., 15 minutes prior to the present time) (S11). For example, the discrimination unit 28 discriminates whether the probe vehicle 10 has taken the course of getting off the freeway 50 and advancing toward the exit as shown in (a) of FIG. 11, or the probe vehicle 10 has taken the course of traveling straight ahead on the freeway 50 as shown in (b) of FIG. 11.

Thereafter, the tail position calculation unit 25, the recommendation section calculation unit 26, and the provision unit 27 execute the processes in steps S3 to S10 for each course discriminated by the discrimination unit 28 (loop A).

Thus, information of a lane-change recommendation section for each course can be transmitted to the target vehicle 30.

Upon receiving the information of the lane-change recommendation section, the target vehicle 30 can execute a safety driving assistant process according to the course in which the target vehicle 30 advances. For example, it is assumed that lane-change recommendation sections are calculated from the probe vehicle 10 advancing toward the exit and the probe vehicle 10 traveling straight ahead as shown in (a) and (b) of FIG. 11, respectively.

When the target vehicle 30 advances toward the exit, the safety driving assistant unit 33 performs the safety driving assistant process based on the lane-change recommendation section shown in (a) of FIG. 11. That is, when the target vehicle 30 advances toward the exit, the navigation unit 34 instructs the driver or the traveling control unit 37 performs lane-change control so that a lane change is made from the passing lane 52 to the cruising lane 51 in the lane-change recommendation section shown in (a) of FIG. 11. Thus, it is possible to avoid a situation that the target vehicle 30 misses the timing of a lane change, and becomes incapable of entering the congested lane.

On the other hand, when the target vehicle 30 plans to travel straight ahead, the safety driving assistant unit 33 executes the safety driving assistant process based on the lane-change recommendation section shown in (b) of FIG. 11. In this case, the target vehicle 30 is already traveling on the main lane, and therefore need not make a lane change. However, the navigation unit 34 can instruct the driver to reduce the speed or the traveling control unit 37 can perform deceleration control in the lane-change recommendation section shown in (b) of FIG. 11. Thus, the target vehicle 30 can follow the end of the congestion line of vehicles, at a safe speed.

2-3. Effect of Second Embodiment

As described above, according to the second embodiment, the course of each probe vehicle 10 is discriminated based on probe information, and a traffic congestion tail position and a lane-change recommendation section are calculated for each course. Therefore, when traffic congestion occurs due to probe vehicles 10 advancing toward a target branch point, the driver or the automatic traveling target vehicle 30 can be instructed to follow the tail of the traffic congestion in advance in order to branch off at the branch point. Thus, safety driving assistance to prevent the target vehicle from forcefully cutting into the congestion line, and cause the target vehicle to advance toward the target branch point, can be realized.

Third Embodiment

In the second embodiment, a lane-change recommendation section is calculated for each of the courses of probe vehicles 10. This third embodiment is different from the second embodiment in that a lane-change recommendation section is calculated for each of lanes on which probe vehicles 10 travel. Hereinafter, differences from the first and second embodiments will be mainly described while descriptions similar to the first and second embodiments are omitted as appropriate.

The configuration of the safety driving assistant system according to the third embodiment is identical to the configuration of the safety driving assistant system 1 according to the first embodiment shown in FIG. 1, and therefore, detailed description thereof is not repeated.

3-1. Configuration of Server 20

The configuration of the server according to the third embodiment is identical to the configuration of the server 20 according to the second embodiment shown in FIG. 9 except for the process executed by the discrimination unit 28. That is, the discrimination unit 28 discriminates a lane on which each probe vehicle 10 travels, based on the probe information, after map matching, stored in the locus information accumulation unit 23. When a probe vehicle 10 is an automatic traveling vehicle, probe information thereof includes information of a lane on which the probe vehicle 10 travels. Therefore, the lane on which the probe vehicle 10 travels can be discriminated by collating the information of the lane included in the probe information with the road map information stored in the map information accumulation unit 24. Also when the position indicated by the probe information is highly accurate, the lane on which the probe vehicle 10 travels can be discriminated by collating the position with the road map information.

3-2. Processing Flow of Server 20

Figure 12:
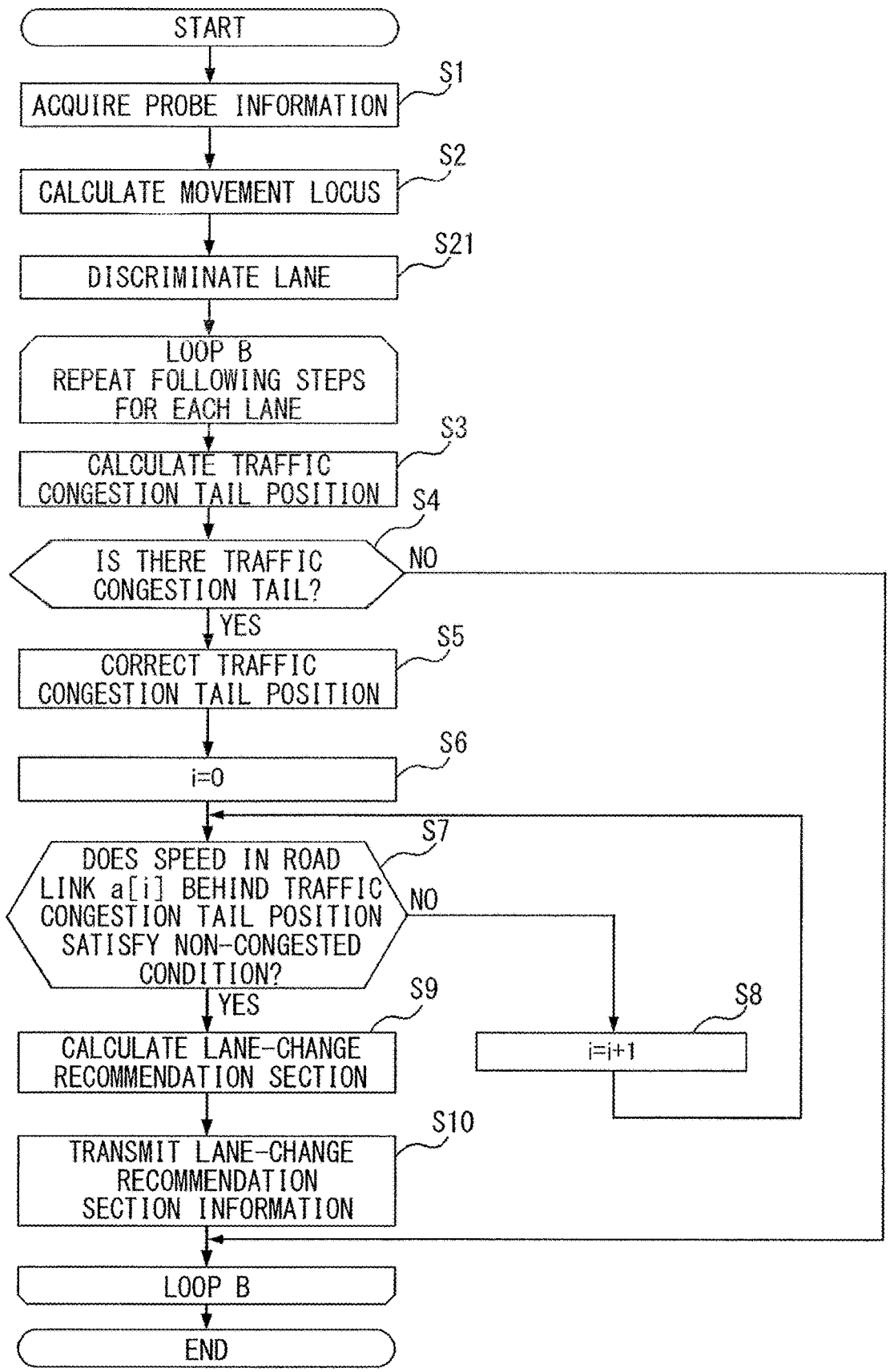
FIG. 12 is a flowchart showing a flow of processing executed by the server.
Figure 13A:
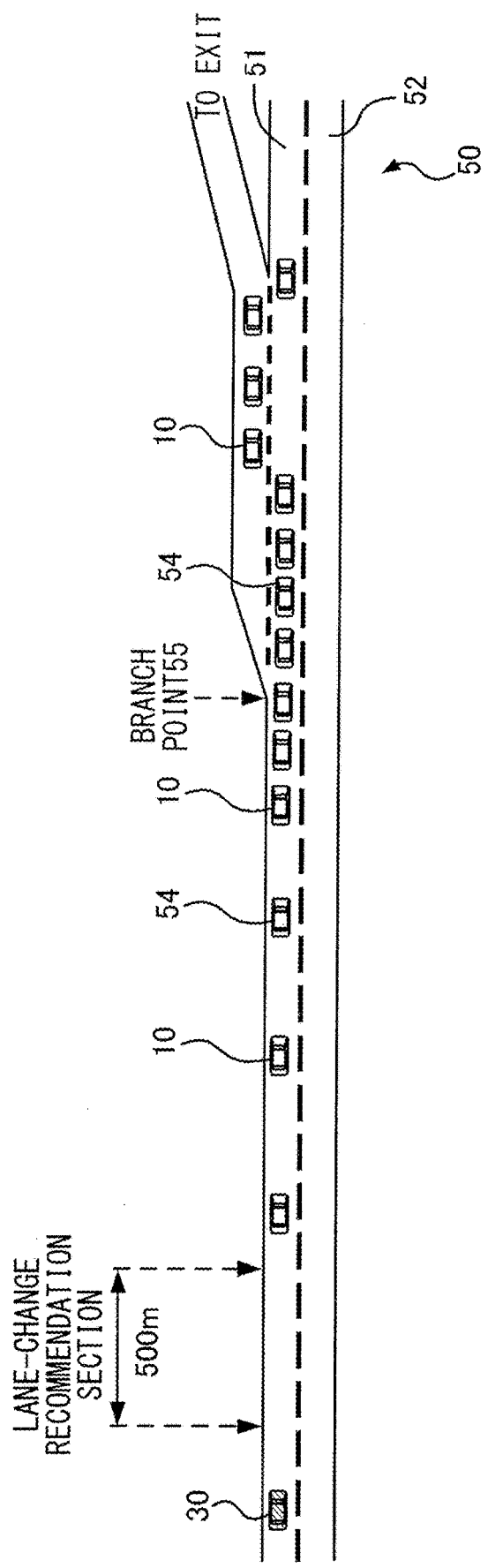
FIG. 13A is a diagram for explaining the processing executed by the server.
Figure 13B:
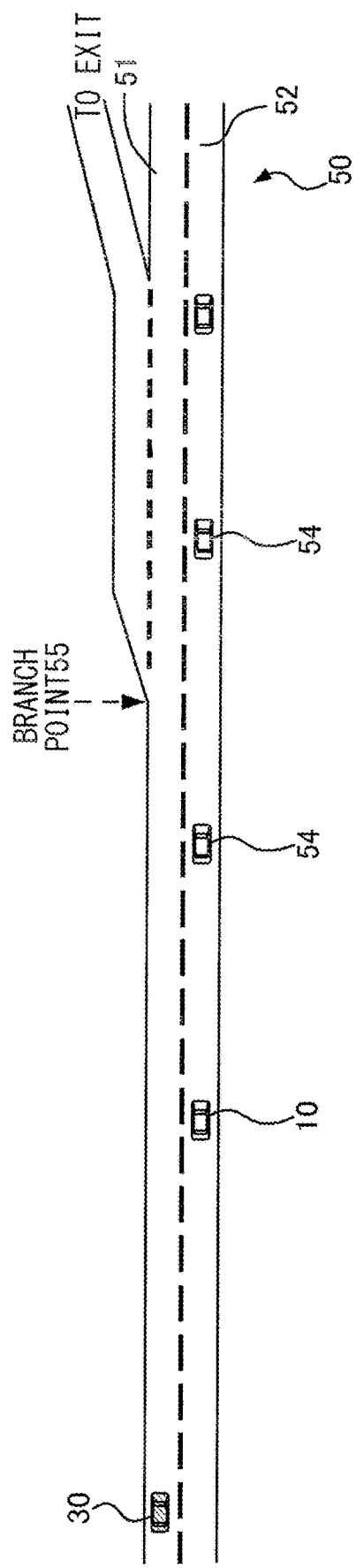
FIG. 13B is a diagram for explaining the processing executed by the server.

FIG. 12 is a flowchart showing a flow of processing executed by the server 20. FIG. 13A and FIG. 13B are diagrams for explaining the processing executed by the server 20. FIG. 13A shows an example of vehicles 54 traveling on a cruising lane 51 of a freeway 50, and FIG. 13B shows an example of vehicles 54 traveling on a passing lane 52 of the freeway 50.

With reference to FIG. 12, the processes in steps S1 to S10 are the same as those shown in FIG. 5.

After the movement locus calculating process (S2), the discrimination unit 28 discriminates, based on probe information, the lane on which each probe vehicle 10 traveling on the freeway 50 has traveled within a predetermined time period (e.g., 15 minutes) (S21). For example, the discrimination unit 28 discriminates whether a probe vehicle 10 has traveled on the cruising lane 51 as shown in FIG. 13A, or a probe vehicle 10 has traveled on the passing lane 52 as shown in FIG. 13B.

Thereafter, the tail position calculation unit 25, the recommendation section calculation unit 26, and the provision unit 27 execute the processes in steps S3 to S10 for each lane discriminated by the discrimination unit 28 (loop B).

Thus, information of a lane-change recommendation section for each lane can be transmitted to the target vehicle 30.

Upon receiving the information of the lane-change recommendation section, the target vehicle 30 can execute a safety driving assistant process according to the course in which the target vehicle 30 advances and the lane on which the target vehicle 30 travels. For example, it is assumed that a lane-change recommendation section is calculated from a probe vehicle 10 traveling on the cruising lane 51 as shown in FIG. 13A, while no lane-change recommendation section is calculated from a probe vehicle 10 traveling on the passing lane 52 as shown in FIG. 13B.

For example, when the target vehicle 30 traveling on the cruising lane 51 plans to advance toward the exit of the freeway 50, the target vehicle 30 need not make a lane change because it is already traveling on the cruising lane 51. However, the navigation unit 34 can instruct the driver to reduce the speed or the traveling control unit 37 can perform deceleration control in the lane-change recommendation section shown in FIG. 13A. Thus, the target vehicle 30 can follow the end of the congestion line of vehicles, at a safe speed.

On the other hand, when the target vehicle 30 plans to travel straight ahead on the freeway 50, the navigation unit 34 can instruct the driver to make a lane change from the cruising lane 51 which is congested to the passing lane 52 which is not congested, or the traveling control unit 37 can make a lane change, in the lane-change recommendation section shown in FIG. 13A. Thus, the target vehicle 30 is prevented from being caught in the traffic congestion, and missing the timing of a lane change.

3-3. Effect of Third Embodiment

As described above, according to the third embodiment, the lane on which each probe vehicle 10 travels is discriminated based on the probe information of the probe vehicle 10, and a traffic congestion tail position and a lane-change recommendation section are calculated for each lane. Therefore, the driver of the target vehicle 30 traveling on a congested lane can be recommended to make a lane change to a non-congested lane, or make a lane change in advance to a congested lane connected to a target branch point. Thus, safety traveling of the target vehicle 30 can be supported.

When at least one of a plurality of lanes is congested while at least one of the rest lanes is not congested, the safety driving assistant process can be made different for each lane on which the target vehicle 30 advances. Thus, traveling according to the lane congestion state can be supported.

For example, when the target vehicle 30 enters the congested lane, traveling support for causing the target vehicle 30 to follow the end of the congestion lane of vehicles at a safe speed, can be performed. Meanwhile, when the target vehicle 30 enters the non-congested lane, traveling support for causing the target vehicle 30 to make a lane change in the lane-change recommendation section, can be performed. Thus, the target vehicle 30 is prevented from being caught in the traffic congestion, and missing the timing of a lane change.

Fourth Embodiment

In the first embodiment, probe information received from automatic traveling vehicles and probe information received from ordinary vehicles driven by drivers are used without discriminating them from each other. This fourth embodiment is different from the first embodiment in that probe information received from automatic traveling vehicles is preferentially used. Hereinafter, this difference from the first embodiment will be mainly described while description similar to the first embodiment is omitted as appropriate.

The configuration of the safety driving assistant system according to the fourth embodiment is identical to the configuration of the safety driving assistant system 1 according to the first embodiment shown in FIG. 1, and therefore, detailed description thereof is not repeated.

4-1. Configuration of Server 20

The configuration of the server according to the fourth embodiment is identical to the configuration of the server 20 according to the first embodiment shown in FIG. 3 except for the processes executed by the tail position calculation unit 25 and the recommendation section calculation unit 26.

The tail position calculation unit 25 calculates a traffic congestion tail position by preferentially using probe information acquired from automatic traveling vehicles (hereinafter referred to as "automatic-travel probe information") among pieces of probe information stored in the locus information accumulation unit 23. For example, the tail position calculation unit 25 calculates a traffic congestion tail position in the same manner as in the first embodiment by using the automatic-travel probe information. When a traffic congestion tail position is calculated, the traffic congestion tail position calculated based on the automatic-travel probe information is outputted to the recommendation section calculation unit 26. When no traffic congestion tail position is calculated, the tail position calculation unit 25 calculates a traffic congestion tail position in the same manner as in the first embodiment by using probe information (hereinafter referred to as "whole probe information") including both probe information obtained from automatic traveling vehicles and probe information obtained from ordinary probe vehicles 10.

The recommendation section calculation unit 26 calculates a lane-change recommendation section, based on the traffic congestion tail position calculated by preferentially using the automatic-travel probe information. That is, when the tail position calculation unit 25 has been able to calculate a traffic congestion tail position by using the automatic-travel probe information, the recommendation section calculation unit 26 calculates a lane-change recommendation section based on the traffic congestion tail position. When the tail position calculation unit 25 has not been able to calculate a traffic congestion tail position by using the automatic-travel probe information but has been able to calculate a traffic congestion tail position based on the whole probe information, the recommendation section calculation unit 26 calculates a lane-change recommendation section based on the traffic congestion tail position calculated based on the whole probe information.

The flow of processing executed by the server 20 is identical to that shown in FIG. 5 except for the processes executed by the tail position calculation unit 25 and the recommendation section calculation unit 26.

4-2. Effect of Fourth Embodiment

Automatic traveling vehicles are designed to perform safe driving at all times. Therefore, it is considered that a traffic congestion tail position and a lane-change recommendation section, which are calculated by preferentially using probe information of automatic traveling vehicles that do not perform unreasonable driving, are highly reliable. Therefore, according to the fourth embodiment, the reliability of the traffic congestion tail position and the lane-change recommendation section can be enhanced, thereby supporting safer driving of the target vehicle.

Fifth Embodiment

In the third and fourth embodiments, a lane-change recommendation section is calculated for each of lanes on which probe vehicles 10 travel, by using probe information acquired from probe vehicles 10 that are automatic traveling vehicles. However, probe information to be used for calculation of a lane-change recommendation section for each lane is not limited to probe information acquired from automatic traveling vehicles. That is, any probe information can be used for calculation of a lane-change recommendation section for each lane, as long as the probe information is acquired from a probe vehicle 10 whose traveling lane can be identified. Hereinafter, a vehicle whose traveling lane can be identified is referred to as a lane identifiable vehicle. An automatic traveling vehicle is a type of lane identifiable vehicle.

In the fifth embodiment, the lane identifiable vehicle will be described in detail.

5-1. Configuration of Probe Vehicle 10 as Lane Identifiable Vehicle

Figure 14:
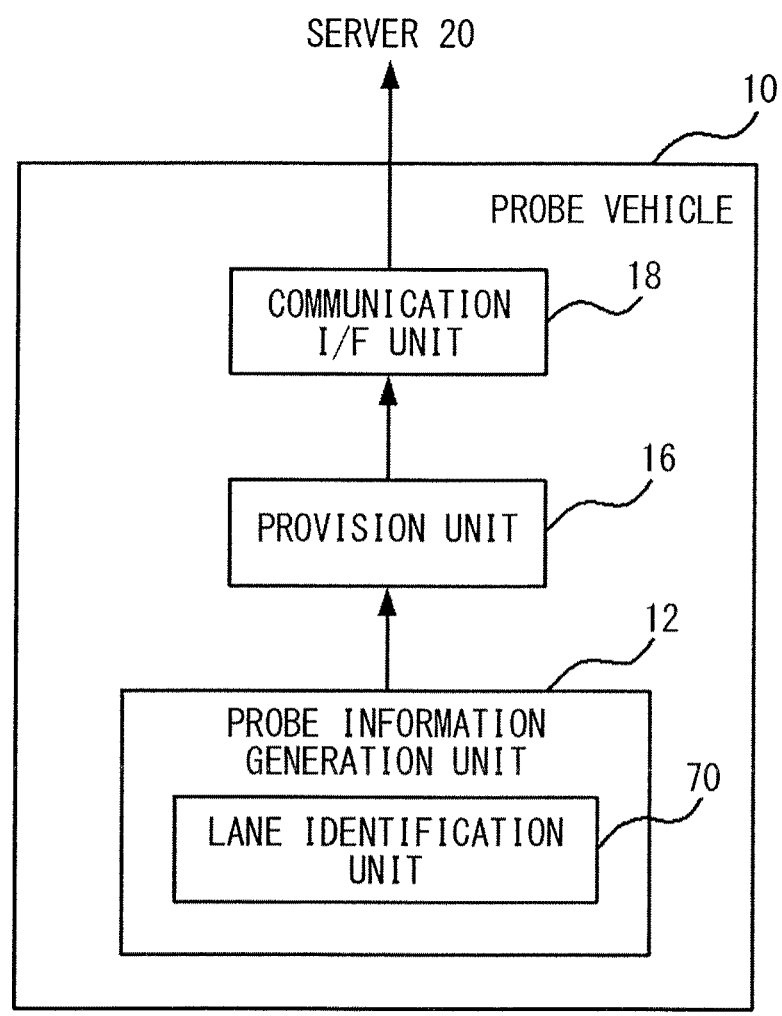
FIG. 14 is a block diagram showing a functional configuration of a probe vehicle that is a lane identifiable vehicle.

FIG. 14 is a block diagram showing a functional configuration of a probe vehicle 10 that is a lane identifiable vehicle. The probe vehicle 10 shown in FIG. 14 includes a lane identification unit 70 instead of the GPS device 14 in the configuration of the probe vehicle 10 shown in FIG. 2.

Figure 15:
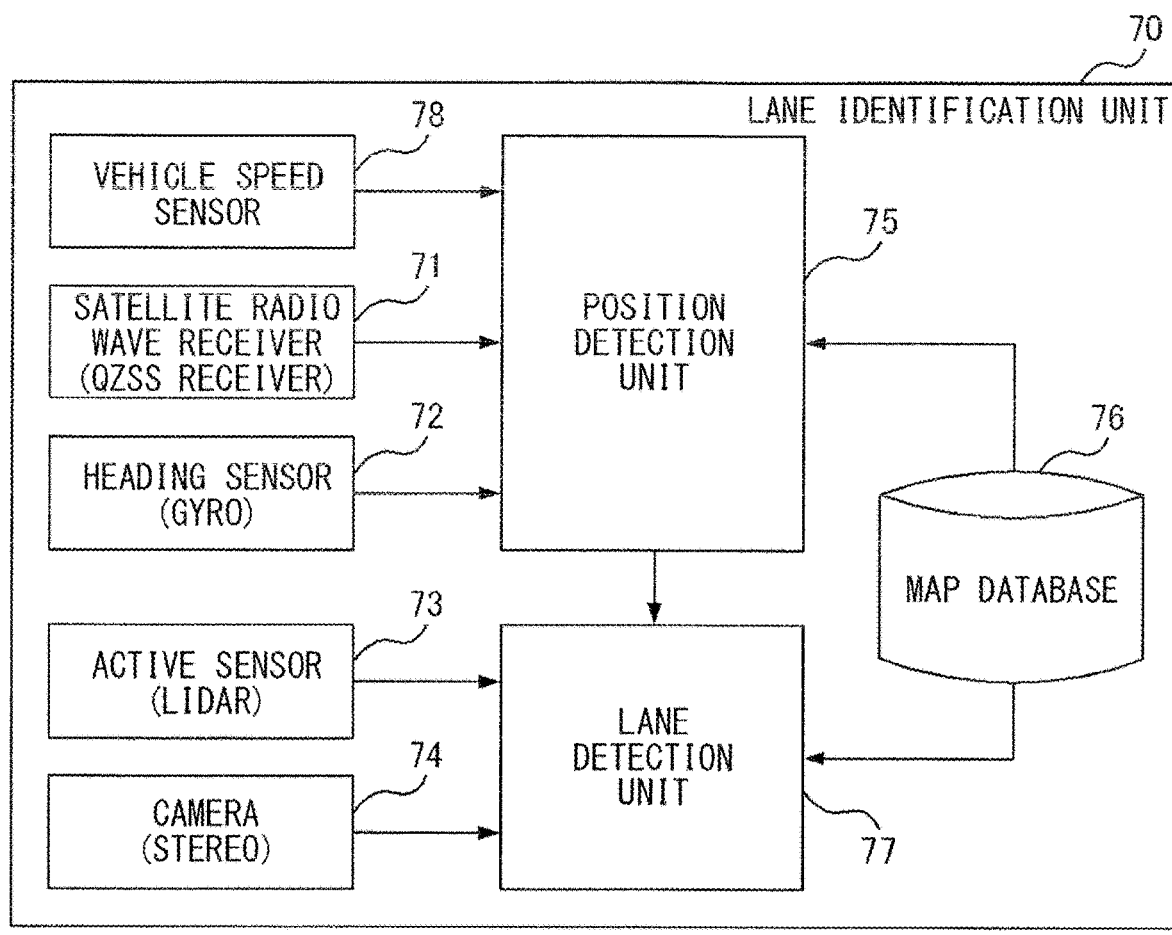
FIG. 15 is a block diagram showing a functional configuration of a lane identification unit.

FIG. 15 is a block diagram showing a configuration of the lane identification unit 70. The lane identification unit 70 is a processing unit for identifying a road link and a lane on which the probe vehicle 10 travels. The lane identification unit 70 includes a vehicle speed sensor 78, a satellite radio wave receiver 71, a heading sensor 72, an active sensor 73, a camera 74, a position detection unit 75, a map database 76, and a lane detection unit 77. The position detection unit 75 and the lane detection unit 77 are implemented by a processor such as a CPU or an MPU that performs digital signal processing. These units 75 and 77 may be implemented by a single processor, or may be implemented by separate processors.

The vehicle speed sensor 78 obtains speed information by measuring the number of rotations of the wheels of the probe vehicle 10. The traveling speed information of the probe vehicle 10 detected by the vehicle speed sensor 78 may be included in the probe information.

The satellite radio wave receiver 71 receives radio waves from a satellite, and measures the latitude, longitude, and altitude of the position where the probe vehicle 10 is located. Although a GPS receiver is commonly used as the satellite radio wave receiver 71, it is desirable to use a QZSS (Quasi-Zenith Satellite System) receiver having higher accuracy than the GPS receiver. By using the QZSS receiver, a positioning signal received by a GPS receiver is complemented and reinforced to improve positioning accuracy.

The heading sensor 72 is a sensor for measuring heading of the probe vehicle 10, and is implemented by an oscillating-type gyroscope or an optical gyroscope. It is desirable to use, as the heading sensor 72, an optical gyroscope having higher accuracy than the oscillating-type gyroscope.

The active sensor 73 is a sensor for detecting white lines and structures. A sensor using a millimeter wave radar or the like is known as the active sensor 73. However, it is desirable to use LIDAR (Light Detection and Ranging, Laser Imaging Detection and Ranging) which is able to include a difference in reflectivity between a white line and a road surface, in data showing a three-dimensional space structure. According to LIDAR, the distance to a target and the characteristics of the target can be analyzed by measuring scattering light from the target caused by irradiation with laser light emitted in a pulse shape.

The camera 74 detects a white line and a structure from a captured image. The camera 74 may be either a monocular camera or a stereo camera, but it is desirable to use the stereo camera which is able to three-dimensionally determine whether or not a white line is present on the road surface.

The map database 76 is implemented by an HDD or the like in which highly-accurate road map data is stored. The road map data includes information such as road edge (division) lines, road (lane) center lines, road widths, vertical and cross slopes, traffic signal/sign points, stop lines, etc., and has a read-ahead network structure.

The position detection unit 75 collates the positional information of the probe vehicle 10 measured by the satellite radio wave receiver 71 with the road map data stored in the map database 76, thereby detecting the position, on the road link, where the probe vehicle 10 is traveling. For example, the position detection unit 75 obtains a traveling locus of the probe vehicle 10 from the positional information of the probe vehicle 10 sequentially outputted from the satellite radio wave receiver 71. The position detection unit 75 compares the obtained traveling locus with the road map data stored in the map database 76, and performs a map matching process of correcting the present position of the probe vehicle 10 on the road, focusing on feature parts on the traveling locus, such as intersections and inflection points, thereby detecting the position of the probe vehicle 10 (refer to Patent Literature 3, for example). If the satellite radio wave receiver 71 cannot measure the positional information of the probe vehicle 10 due to the radio wave status or the like, the position detection unit 75 may calculate the traveling distance of the probe vehicle 10 from the speed of the probe vehicle 10 obtained from the vehicle speed sensor 78, and may sequentially calculate the position of the probe vehicle 10, based on the calculated traveling distance and heading information of the probe vehicle 10 measured by the heading sensor 72.

The lane detection unit 77 collates the white line and the structure detected by the active sensor 73 and the white line and the structure detected by the camera 74 with the road map data stored in the map database 76, thereby identifying the positions of the white line and the structure on the map. The lane detection unit 77 collates the position on the road link where the probe vehicle 10 is traveling, which has been detected by the position detection unit 75, with the positions of the white line and the structure on the map, thereby detecting a lane, on the road link, where the probe vehicle 10 is traveling. The lane detection unit 77 may selectively use the detection result of the active sensor 73 and the detection result of the camera 74 according to the situation. For example, the lane detection unit 77 may use, in a normal situation, the detection result of the camera 74 to identify the positions of the white line and the structure, whereas the lane detection unit 77 may use, in a situation such as nighttime or bad weather where the driver's visibility around the vehicle is degraded, the detection result of the active sensor 73 which is less affected by the degraded visibility, to identify the positions of the white line and the structure (refer to Patent Literatures 4 and 5, for example).

The lane detection unit 77 may collate positional information of fixed objects (e.g., an illuminating lamp installed at the road shoulder, a cat's eye on the road surface, etc.) detected by the probe vehicle 10 with positional information of fixed objects indicated by the road map data, thereby correcting the position of the probe vehicle 10 (refer to Patent Literature 3, for example).

The information of the position on the road link and the line where the probe vehicle 10 is traveling, which are detected by the position detection unit 75 and the lane detection unit 77, respectively, are included in the probe information generated by the probe information generation unit 12 and transmitted to the server 20.

5-2. Configuration of Target Vehicle 30 as Lane Identifiable Vehicle

Figure 16:
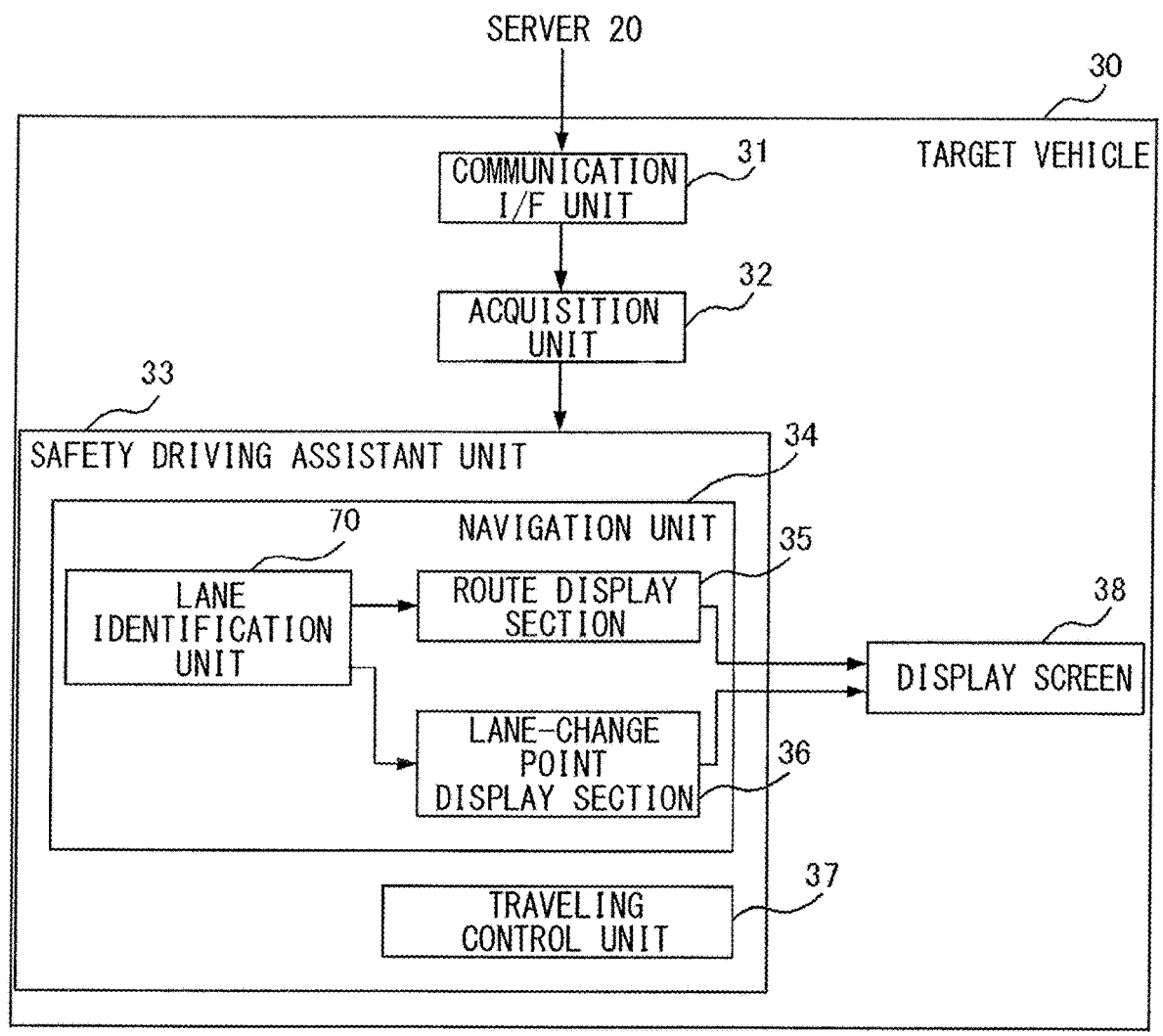
FIG. 16 is a diagram showing a functional configuration of a target vehicle including a lane identification unit.

The configuration of the lane identification unit 70 described above may be included in the target vehicle 30. FIG. 16 is a diagram showing a functional configuration of the target vehicle 30 including the lane identification unit 70. In the target vehicle 30 shown in FIG. 16, the navigation unit 34 further includes the lane identification unit 70 in addition to the components of the target vehicle 30 shown in FIG. 4.

The route display section 35 calculates a route to a destination while discriminating the lanes from each other, based on the traveling position and the traveling lane of the target vehicle 30 which are identified by the lane identification unit 70, and performs control to display the calculated route on the display screen 38. For example, in order to cause the target vehicle 30, which is traveling on the passing lane 52 of the freeway 50 and plans to exit from the freeway 50 via a left exit as shown in (a) to (c) of FIG. 8, to safely exit from the freeway 50 via the left exit, the route display section 35 calculates a route in which the target vehicle 30 makes a lane change to the leftmost cruising lane 51 in advance. Then, the route display section 35 displays information of the calculated route on the display screen 38.

The lane-change point display section 36 performs control to display, in a visible manner, the lane-change recommendation section in the route-to-destination displayed on the display screen 38, based on the traveling position and the traveling lane of the target vehicle 30 which are identified by the lane identification unit 70. For example, the lane-change recommendation section on the lane where the target vehicle 30 is currently traveling is displayed in a color different from a color of other road sections. Thus, the driver can safely perform a lane change in the lane-change recommendation section.

6. Additional Notes

While the safety driving assistant systems according to the embodiments of the present disclosure have been described above, the present disclosure is not limited to the embodiments.

Modifications

While in the first to fourth embodiments the server 20 calculates a lane-change recommendation section, the target vehicle 30 may calculate a lane-change recommendation section.

Figure 17:
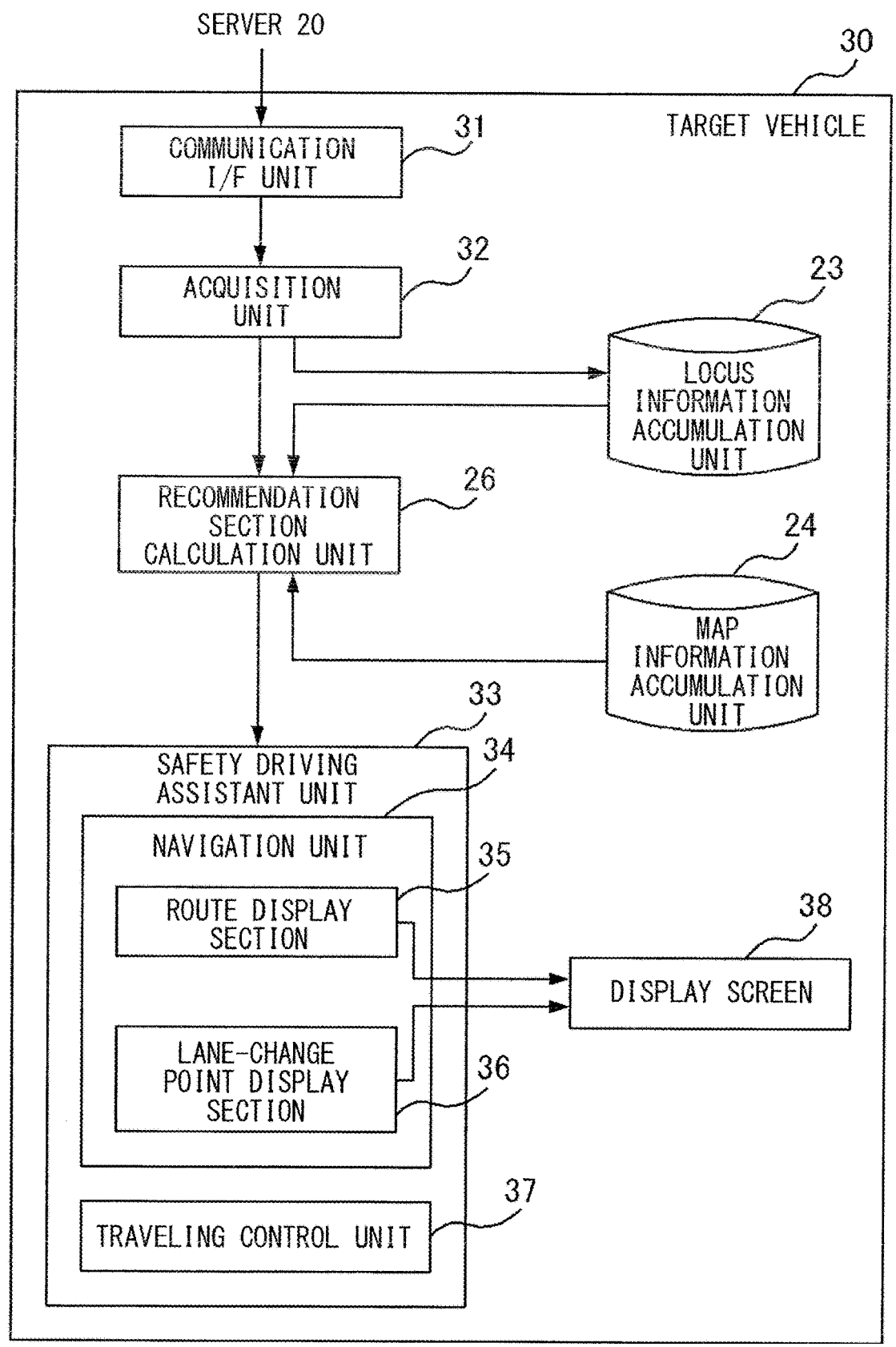
FIG. 17 is a block diagram showing a functional configuration of a target vehicle according to a modification.

FIG. 17 is a block diagram showing a functional configuration of a target vehicle 30 according to a modification.

With reference to FIG. 17, the target vehicle 30 further includes a locus information accumulation unit 23, a map information accumulation unit 24, and a recommendation section calculation unit 26, in addition to the components of the target vehicle 30 according to the first embodiment shown in FIG. 4. These components have been included in the server 20.

Even in the configuration where the target vehicle 30 calculates a lane-change recommendation section, as in the first embodiment, safety driving assistance for the target vehicle 30 can be performed in the same manner as in the first embodiment.

As described above, the components constituting the safety driving assistant system 1 can be freely dispersed and disposed in the probe vehicle 10 and the server 20. Alternatively, the components may be dispersed and disposed in a server other than the server 20.

Although the target vehicle 30 shown in FIG. 4 is assumed to be an automatic traveling vehicle, if the target vehicle 30 is an ordinary vehicle driven by a driver, the traveling control unit 37 need not be provided.

The target vehicle 30 may further include the components of the probe vehicle 10 shown in FIG. 2. Thus, the target vehicle 30 is allowed to transmit probe information.

Each of the aforementioned apparatuses may be specifically configured as a computer system including a microprocessor, an ROM, an RAM, a hard disk drive, a display unit, a keyboard, a mouse, etc. A computer program is stored in the RAM or the hard disk drive. Each apparatus achieves its function through the microprocessor being operated according to the computer program. The computer program is configured by combining a plurality of command codes indicating commands to the computer, in order to achieve predetermined functions.

A part or all of the components of the respective apparatuses may be configured as a single system LSI. The system LSI is a super-multi-function LSI manufactured such that a plurality of components are integrated on a single chip. Specifically, the system LSI is a computer system configured to include a microprocessor, an ROM, an RAM, etc. A computer program is stored in the RAM. The system LSI achieves its function through the microprocessor being operated according to the computer program.

The present disclosure may be the method described above. Further, the present disclosure may be a computer program that causes a computer to execute the method, or may also be a digital signal including the computer program.

The present disclosure may also be realized by storing the computer program or the digital signal in a computer-readable non-transitory recording medium such as a hard disk drive, a CD-ROM, or a semiconductor memory. Alternatively, the present disclosure may also be the digital signal recorded in the non-transitory recording medium.

The present disclosure may also be realized by transmission of the aforementioned computer program or digital signal via a telecommunication line, a wireless or wired communication line, a network represented by the Internet, a data broadcast, etc.

The respective steps included in the program may be executed by a plurality of computers.

The aforementioned embodiments and modifications may be respectively combined.

It is noted that the embodiments disclosed herein are merely illustrative in all aspects and should not be recognized as being restrictive. The scope of the present disclosure is defined by the scope of the claims rather than the meaning described above, and is intended to include meaning equivalent to the scope of the claims and all modifications within the scope.

REFERENCE SIGNS LIST 1 safety driving assistant system
10 probe vehicle
12 probe information generation unit
14 GPS device
16 provision unit
18 communication I/F unit
20 server
21 communication I/F unit
22 acquisition unit
23 locus information accumulation unit
24 map information accumulation unit
25 tail position calculation unit
26 recommendation section calculation unit
27 provision unit
28 discrimination unit
30 target vehicle
31 communication I/F unit
32 acquisition unit
33 safety driving assistant unit
34 navigation unit
35 route display section
36 lane-change point display section
37 traveling control unit
38 display screen
40 network
42 wireless base station
50 freeway
51 cruising lane
52 passing lane
53 deceleration lane
54 vehicle
55 branch point
56 road link
70 lane identification unit
71 satellite radio wave receiver
72 heading sensor
73 active sensor
74 camera
75 position detection unit
76 map database
77 lane detection unit
78 vehicle speed sensor

The invention claimed is:

1. A safety driving assistant system comprising a server, and a safety driving assistant device mounted on a target vehicle receiving safety driving assistance, the server including:
a first non-transitory computer readable memory; and
a first hardware processor coupled to the first non-transitory computer readable memory and configured to read instructions from the first non-transitory computer readable memory to cause the server to perform first operations comprising:
acquiring, from probe vehicles, probe information including information of a time within a predetermined time period and a position of the corresponding probe vehicle at the time;
discriminating a lane on which each probe vehicle travels among a plurality of lanes based on the probe information;
calculating, for each lane, a traffic congestion tail position located upstream of a branch point at which a road branches into a plurality of lanes based on the probe information of the probe vehicle traveling on the lane; and
calculating, for each lane, a lane-change recommendation section in which a lane change is recommended based on the traffic congestion tail position regarding the lane,
the safety driving assistant device including:
a second non-transitory computer readable memory; and
a second hardware processor coupled to the second non-transitory computer readable memory and configured to read instructions from the second non-transitory computer readable memory to cause the safety driving assistant device to perform second operations comprising:
executing a safety driving assistant process for the target vehicle based on the lane-change recommendation section for each lane,
wherein in a case where at least one of the plurality of lanes is congested while at least one of the rest of the lanes of the plurality of lanes is not congested, the safety driving assistant process differs depending on an advancing direction of the target vehicle.

2. The safety driving assistant system according to claim 1, wherein when the target vehicle traveling on a congested lane of the plurality of lanes advances ahead on the congested lane, the operation of executing the safety driving assistant process includes executing an assistant process for causing the target vehicle to decelerate and follow a tail of congestion.

3. The safety driving assistant system according to claim 1, wherein when the target vehicle traveling on a congested lane of the plurality of lanes enters a non-congested lane of the plurality of lanes, the operation of executing the safety driving assistant process includes executing an assistant process for causing the target vehicle to make a lane change in the lane-change recommendation section.

4. The safety driving assistant system according to claim 1, wherein the operation of calculating the traffic congestion tail position includes calculating the traffic congestion tail position by preferentially using probe information acquired from a lane identifiable vehicle capable of identifying a traveling lane thereof, among pieces of the probe information, and wherein the operation of calculating the lane-change recommendation section includes calculating the lane-change recommendation section based on the traffic congestion tail position calculated by preferentially using the probe information acquired from the lane identifiable vehicle.

5. The safety driving assistant system according to claim 1, wherein the operation of calculating the lane-change recommendation section further includes searching for a non-congested section where traffic is not congested, on an upstream side of the traffic congestion tail position, and calculating the lane-change recommendation section based on the searched non-congested section.

6. A server comprising:
a non-transitory computer readable memory; and
a hardware processor coupled to the non-transitory computer readable memory and configured to read instructions from the non-transitory computer readable memory to cause the server to perform operations comprising:
acquiring, from probe vehicles, probe information including information of a time within a predetermined time period and a position of the corresponding probe vehicle at the time;
discriminating a lane on which each probe vehicle travels among the plurality of lanes based on the probe information;
calculating, for each lane, a traffic congestion tail position located upstream of a branch point at which a road branches into a plurality of lanes based on the probe information of the probe vehicle traveling on the lane;
calculating, for each lane, a lane-change recommendation section in which a lane change is recommended based on the traffic congestion tail position regarding the lane; and
providing information of the lane-change recommendation section for each lane to a target vehicle to execute a safety driving assistant process for the target vehicle,
wherein in a case where at least one of the plurality of lanes is congested while at least one of the rest of the lanes of the plurality of lanes is not congested, the safety driving assistant process differs depending on an advancing direction of the target vehicle.

7. A safety driving assistant device mounted on a vehicle comprising:
a non-transitory computer readable memory; and
a hardware processor coupled to the non-transitory computer readable memory and configured to read instructions from the non-transitory computer readable memory to cause the safety driving assistant device to perform operations comprising:
acquiring, for each lane, information of a traffic congestion tail position located upstream of a branch point at which a road branches into a plurality of lanes, the traffic congestion tail position being calculated based on probe information, including information of a time within a predetermined time period and a position of the corresponding probe vehicle at the time;
calculating, for each lane a lane-change recommendation section in which a lane change is recommended, based on the information of the traffic congestion tail position regarding the lane; and
executing a safety driving assistant process for the vehicle, based on the lane-change recommendation section for each lane,
wherein in a case where at least one of the plurality of lanes is congested while at least one of the rest of the lanes of the plurality of lanes is not congested, the safety driving assistant process differs depending on an advancing direction of the target vehicle.

8. A safety driving assistant device mounted on a vehicle comprising:
a non-transitory computer readable memory; and
a hardware processor coupled to the non-transitory computer readable memory and configured to read instructions from the non-transitory computer readable memory to cause the safety driving assistant device to perform operations comprising:
acquiring, for each lane, information of a lane-change recommendation section in which a lane change is recommended, the lane-change recommendation section being calculated based on information of a traffic congestion tail position located upstream of a branch point at which a road branches into a plurality of lanes, the traffic congestion tail position being calculated based on probe information, including information of a time within a predetermined time period and a position of the corresponding probe vehicle at the time; and
executing a safety driving assistant process for the vehicle based on the information of the lane-change recommendation section for each lane,
wherein in a case where at least one of the plurality of lanes is congested while at least one of the rest of the lanes of the plurality of lanes is not congested, the safety driving assistant process differs depending on an advancing direction of the target vehicle.

9. A non-transitory computer readable storage medium storing a computer program to be used in a server, the server comprising a hardware processor configured to execute the computer program to cause the server to perform operations comprising:
acquiring, from probe vehicles, probe information including information of a time within a predetermined time period and a position of the corresponding probe vehicle at the time;
discriminating a lane on which each probe vehicle travels among the plurality of lanes based on the probe information;
calculating, for each lane, a traffic congestion tail position located upstream of a branch point at which a road branches into a plurality of lanes based on the probe information of the probe vehicle traveling on the lane;

calculating, for each lane, a lane-change recommendation section in which a lane change is recommended based on the traffic congestion tail position regarding the lane; and providing information of the lane-change recommendation section for each lane to a target vehicle to execute a safety driving assistant process for the target vehicle, wherein in a case where at least one of the plurality of lanes is congested while at least one of the rest of the lanes of the plurality of lanes is not congested, the safety driving assistant process differs depending on an advancing direction of the target vehicle.

10. A non-transitory computer readable storage medium storing a program to be used in a safety driving assistant device mounted on a vehicle, the safety driving assistant device comprising a hardware processor configured to execute the computer program to cause the safety driving assistant device to perform operations comprising:

acquiring, for each lane, information of a traffic congestion tail position located upstream of a branch point at which a road branches into a plurality of lanes, the traffic congestion tail position being calculated based on probe information, including information of a time within a predetermined time period and a position of a probe vehicle at the time;

calculating, for each lane, a lane-change recommendation section in which a lane change is recommended based on the information of the traffic congestion tail position regarding the lane; and executing a safety driving assistant process for the vehicle based on the lane-change recommendation section for each lane, wherein in a case where at least one of the plurality of lanes is congested while at least one of the rest of the lanes of the plurality of lanes is not congested, the safety driving assistant process differs depending on an advancing direction of the target vehicle.

11. A non-transitory computer readable storage medium storing a program to be used in a safety driving assistant device mounted on a vehicle, the safety driving assistant device comprising a hardware processor configured to execute the computer program to cause the safety driving assistant device to perform operations comprising:

acquiring, for each lane, information of a lane-change recommendation section in which a lane change is recommended, the lane-change recommendation section being calculated based on information of a traffic congestion tail position located upstream of a branch point at which a road branches into a plurality of lanes, the traffic congestion tail position being calculated based on probe information, including information of a time within a predetermined time period and a position of the corresponding probe vehicle at the time; and executing a safety driving assistant process for the vehicle based on the information of the lane-change recommendation section for each lane, wherein in a case where at least one of the plurality of lanes is congested while at least one of the rest of the lanes of the plurality of lanes is not congested, the safety driving assistant process differs depending on an advancing direction of the target vehicle.

* * * * *